United States Patent
Day

(10) Patent No.: US 10,042,516 B2
(45) Date of Patent: Aug. 7, 2018

(54) LITHE CLIP SURVEY FACILITATION SYSTEMS AND METHODS

(71) Applicant: Instavid LLC, Bellevue, WA (US)

(72) Inventor: Alexandrea L. Day, Newcastle, WA (US)

(73) Assignee: InstaVid LLC, Bellevue, WA (US)

( * ) Notice: Subject to any disclaimer, the term of this patent is extended or adjusted under 35 U.S.C. 154(b) by 0 days.

(21) Appl. No.: 15/360,868

(22) Filed: Nov. 23, 2016

(65) Prior Publication Data
US 2017/0075526 A1 Mar. 16, 2017

Related U.S. Application Data

(63) Continuation-in-part of application No. 15/181,273, filed on Jun. 13, 2016, which is a continuation of (Continued)

(51) Int. Cl.
| | |
|---|---|
| G06F 3/048 | (2013.01) |
| G06F 17/00 | (2006.01) |
| G06F 3/0482 | (2013.01) |
| G06F 17/22 | (2006.01) |
| G06F 17/30 | (2006.01) |
| G06F 3/0484 | (2013.01) |
| H04L 29/06 | (2006.01) |
| H04N 21/414 | (2011.01) |
| H04N 21/431 | (2011.01) |

(Continued)

(52) U.S. Cl.
CPC ........ *G06F 3/0482* (2013.01); *G06F 3/03543* (2013.01); *G06F 3/0484* (2013.01); *G06F 3/04812* (2013.01); *G06F 3/04817* (2013.01); *G06F 3/04883* (2013.01); *G06F 17/2247* (2013.01); *G06F 17/30849* (2013.01); *H04L 65/4069* (2013.01); *H04L 65/608* (2013.01); *H04L 67/02* (2013.01); *H04L 67/18* (2013.01); *H04L 67/306* (2013.01); *H04N 21/41407* (2013.01); *H04N 21/4312* (2013.01); *H04N 21/482* (2013.01); *H04N 21/4821* (2013.01); *G06F 2203/04803* (2013.01); *H04N 21/8549* (2013.01)

(58) Field of Classification Search
CPC .............................. G06Q 30/02; G06F 3/0482
USPC ................... 715/838, 719, 200, 234
See application file for complete search history.

(56) References Cited

U.S. PATENT DOCUMENTS

| | | |
|---|---|---|
| 6,118,493 A | 9/2000 | Duhault et al. |
| 6,907,570 B2 * | 6/2005 | Amir ................ G06F 17/30017 707/E17.009 |

(Continued)

OTHER PUBLICATIONS

Videocopilot, Videocopilot, Nov. 13, 2010, Videocopilot, pp. 1-108 (pdf).*

(Continued)

*Primary Examiner* — Manglesh M Patel
(74) *Attorney, Agent, or Firm* — Ellen M. Bierman; Lowe Graham Jones PLLC

(57) ABSTRACT

Methods and systems are presented for configuring and using a graphical container identified by an embed code (in a web page, e.g.) at least partly presented by a mobile client device, facilitating a consumer's rapid review of several items of video preview content each derived from a movie or other video-containing primary content.

19 Claims, 17 Drawing Sheets

Related U.S. Application Data application No. 15/156,251, filed on May 16, 2016, which is a continuation of application No. 13/309,303, filed on Dec. 1, 2011, now Pat. No. 9,342,212.

(60) Provisional application No. 61/572,304, filed on Dec. 2, 2010.

(51) Int. Cl.

| | |
|---|---|
| *H04N 21/482* | (2011.01) |
| *H04L 29/08* | (2006.01) |
| *G06F 3/0354* | (2013.01) |
| *G06F 3/0488* | (2013.01) |
| *G06F 3/0481* | (2013.01) |
| *H04N 21/8549* | (2011.01) |

(56) References Cited

U.S. PATENT DOCUMENTS

| | | | | |
|---|---|---|---|---|
| 7,177,356 | B2 * | 2/2007 | Moni | H04N 19/176 375/240.01 |
| 8,069,414 | B2 * | 11/2011 | Hartwig | G06F 17/30781 715/203 |
| 8,078,603 | B1 | 12/2011 | Chandratillake et al. | |
| 8,713,439 | B2 * | 4/2014 | Blinnikka | G06F 3/04817 715/203 |
| 9,386,328 | B1 | 7/2016 | Crane et al. | |
| 2007/0130159 | A1 | 6/2007 | Gulli et al. | |
| 2007/0130602 | A1 | 6/2007 | Gulli et al. | |
| 2007/0204238 | A1 | 8/2007 | Hua et al. | |
| 2008/0034306 | A1 | 2/2008 | Ording | |
| 2008/0034329 | A1 * | 2/2008 | Posner | G06F 9/4446 715/856 |
| 2008/0086688 | A1 | 4/2008 | Chandratillake et al. | |
| 2008/0111822 | A1 * | 5/2008 | Horowitz | H04N 21/8126 345/530 |
| 2008/0152299 | A1 | 6/2008 | Ubillos | |
| 2009/0150784 | A1 * | 6/2009 | Denney | G06F 17/3084 715/722 |
| 2011/0161818 | A1 * | 6/2011 | Viljamaa | G11B 27/28 715/720 |
| 2011/0175932 | A1 * | 7/2011 | Yu | G06F 3/048 345/661 |
| 2013/0080895 | A1 | 3/2013 | Rossman et al. | |
| 2014/0219634 | A1 * | 8/2014 | McIntosh | G11B 27/105 386/278 |

OTHER PUBLICATIONS

Florent et al., Stackoverflow, Dec. 20, 2013, Stackoverflow, pp. 1-4 (pdf).

Wistia, Wistia Video Player API, Jul. 31, 2010, Wistia, pp. 1-3 (pdf).

* cited by examiner

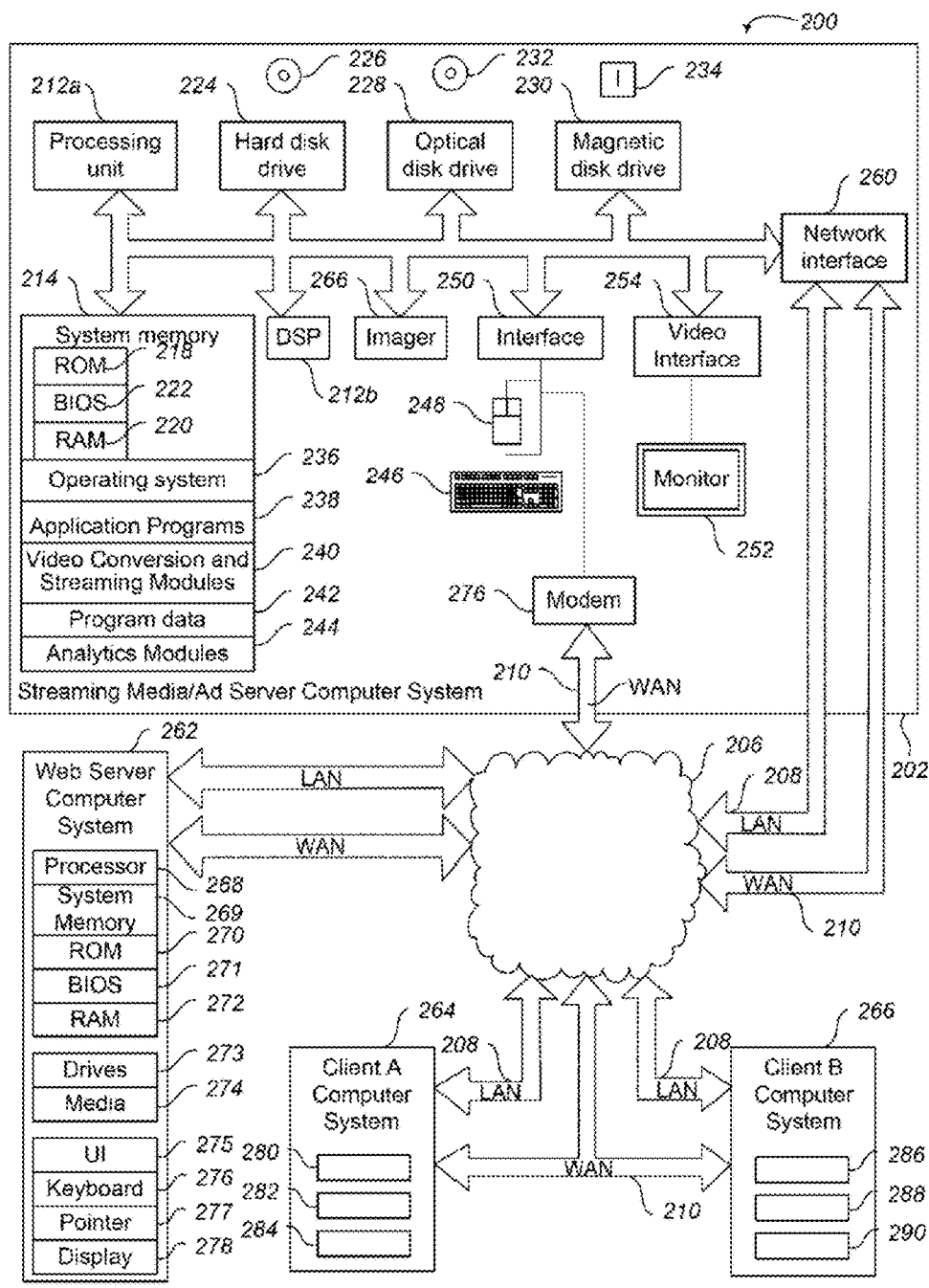

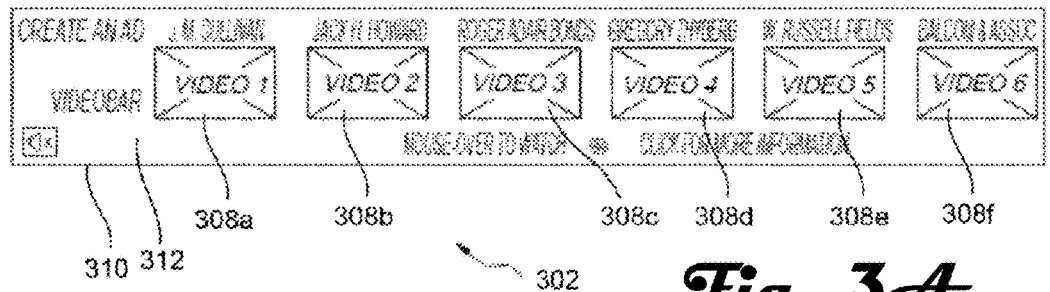
*Fig. 3A*
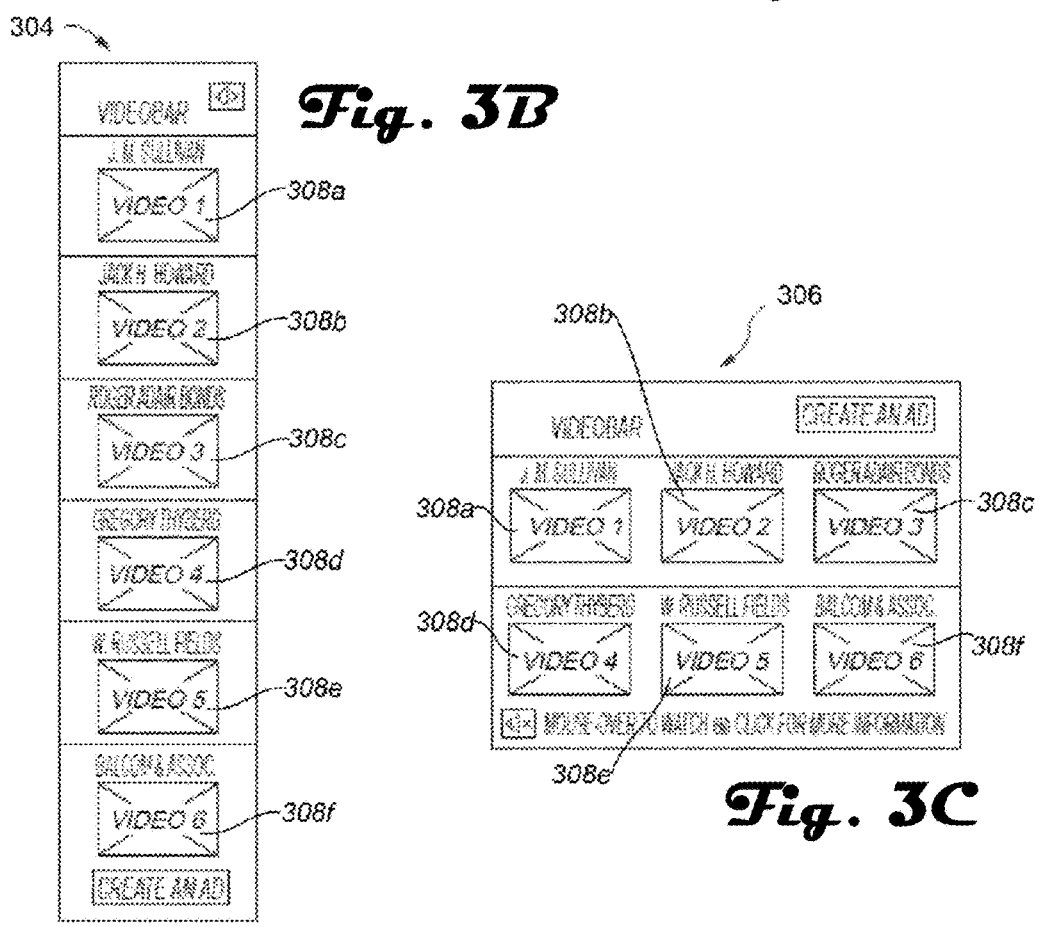
*Fig. 3B*
*Fig. 3C*

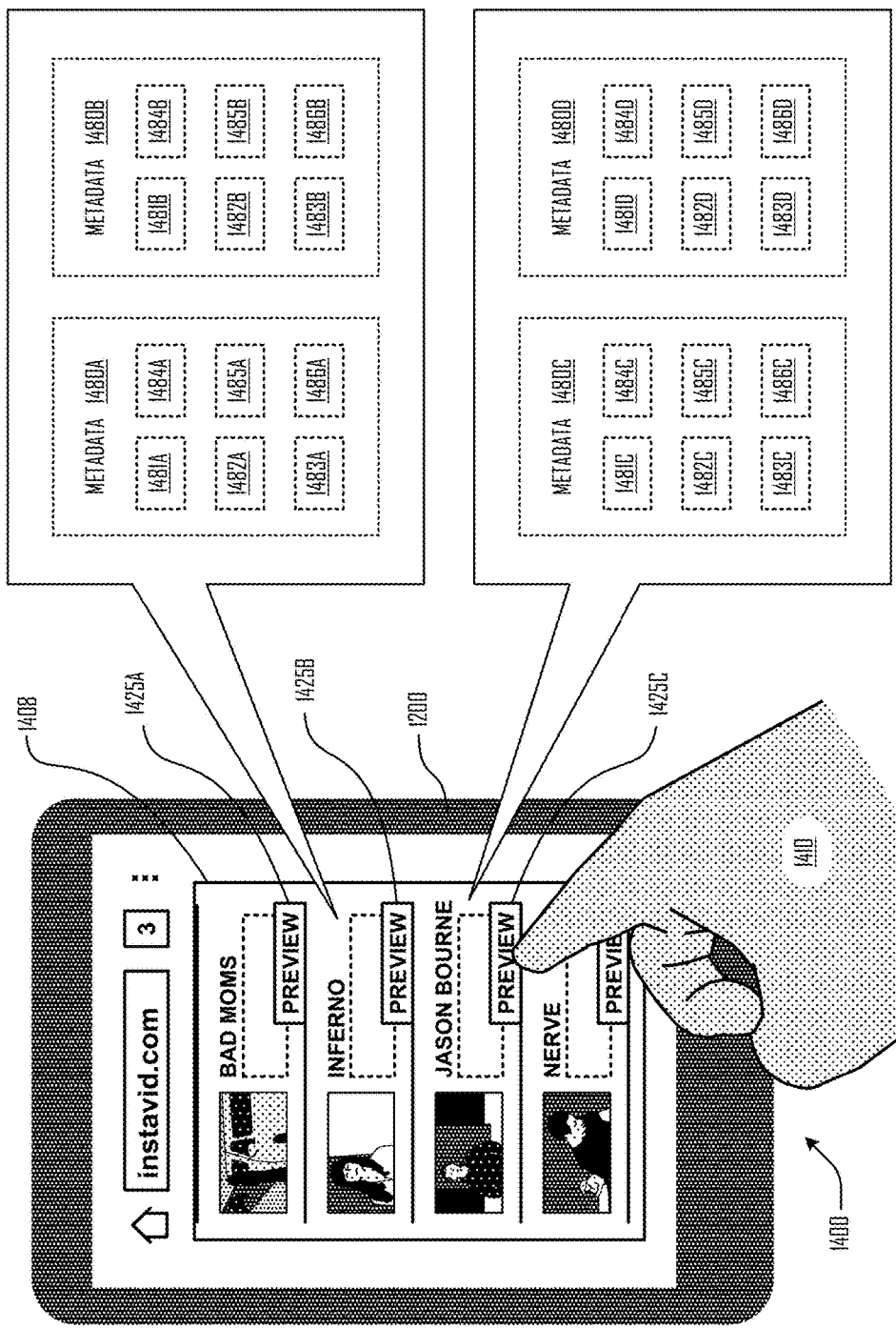

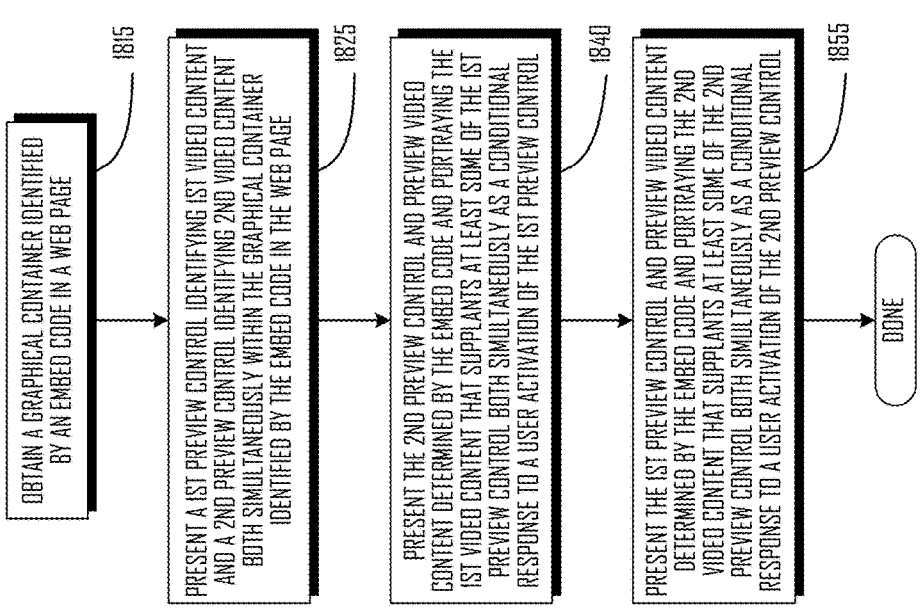
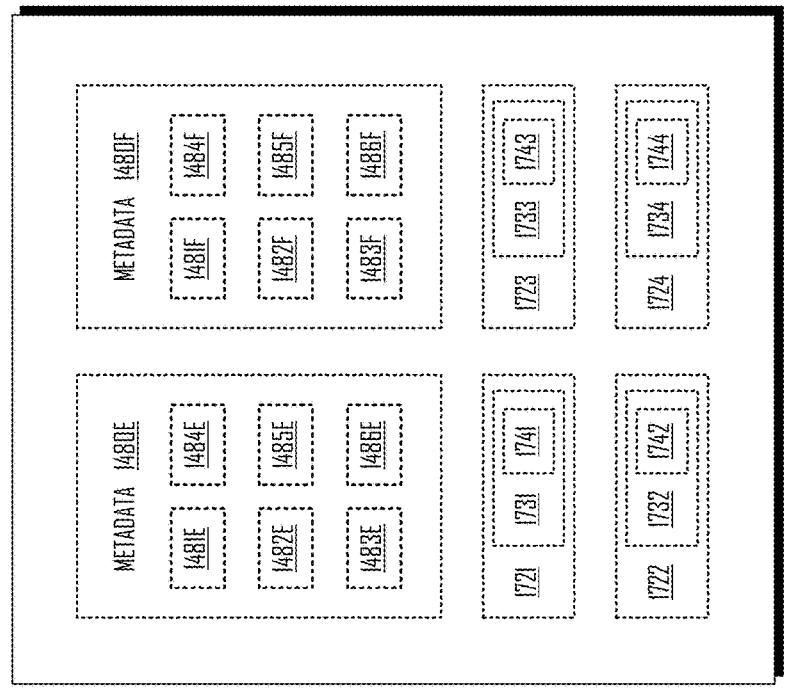

LITHE CLIP SURVEY FACILITATION SYSTEMS AND METHODS

The Application Data Sheet filed herewith forms a part of the present application, and all priority documents to which it refers are incorporated by reference herein in their entirety.

FIELD

This disclosure generally relates to multimedia content, and particularly multimedia content in digital containers.

DESCRIPTION OF THE RELATED ART

There is a rapidly increasing need for effective and efficient media and communications methods for streaming information to users through Internet based Web browsers and other graphical user interfaces, especially of applications having Internet connectivity. Specifically, the need for video content is growing as networks become adapted for high-speed data transfer and electronic devices are engineered for displaying video files through networks. Hence, new approaches to providing streaming and other media content to distributed users are desirable.

BRIEF DESCRIPTION OF THE SEVERAL VIEWS OF THE DRAWINGS

To easily identify the discussion of any particular element or act in the drawings, the most significant digit or digits in a reference number refer to the figure number in which that element is first introduced. Identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2 is a schematic diagram of an electronic commerce environment having a streaming media and advertisement server computer system, a Web server computer system, and example client computer systems, according to some illustrated embodiments.

FIGS. 3A-3C are diagrams of streaming media containers of various example configurations, according to different illustrated embodiments.

FIG. 6 is a diagram of a streaming media container such as that shown in FIG. 3A integrated into a different position in an example Web page, according to some illustrated embodiments.

FIG. 7 is a diagram of a streaming media container such as that shown in FIG. 3B integrated into an example Web page, according to some illustrated embodiments.

FIG. 14 illustrates a system that includes a handheld device in accordance with one or more embodiments.

FIG. 17 illustrates event-sequencing logic in accordance with one or more embodiments.

FIG. 18 illustrate an operational flow in accordance with one or more embodiments.

DETAILED DESCRIPTION

Figure 1:
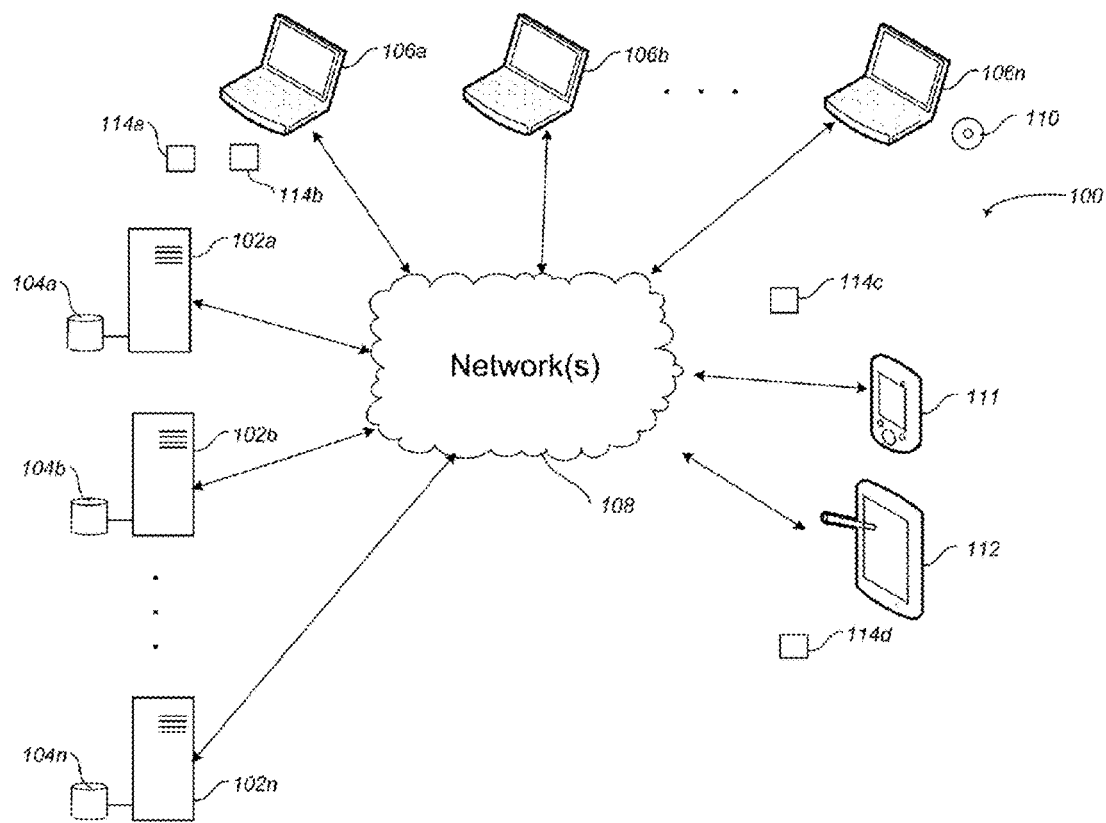
FIG. 1 is a schematic diagram of a networked environment, including a number of servers and a number of clients communicatively coupled to the servers by one or more networks, of which systems, devices and methods for streaming multiple different media content in a digital container may be a part, or in which they may be implemented, according to some illustrated embodiments.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

"Activated," "aligned," "as," "at," "automatic," "based," "both," "by," "conditional," "configured," "covered," "different," "distilled," "each," "equal," "first," "generated," "graphical," "greater," "horizontal," "identified," "immediate," "initial," "invoked," "less," "matched," "mobile," "narrow," "open," "partly," "portraying," "presented," "respective," "responsive," "second," "sequential," "simultaneously," "smaller," "smaller," "some," "supplanted," "thereof," "third," "transmitted," "to," "uniform," "vertical," "wherein," "within," or other such descriptors herein are used in their normal yes-or-no sense, not as terms of degree, unless context dictates otherwise. In light of the present disclosure those skilled in the art will understand from context what is meant by "remote" and by other such positional descriptors used herein. Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

The headings and Abstract of the Disclosure provided herein are for convenience only and do not interpret the scope or meaning of the embodiments.

FIG. 1 shows a networked environment 100, including a number of servers and a number of clients communicatively coupled to the servers by one or more networks, of which systems, devices and methods for streaming multiple different media content in a digital container may be a part, or in which they may be implemented, according to some illustrated embodiments. "Streaming media" as used herein includes digital media (audio, video, images, etc.) that is constantly or substantially constantly received by and presented to an end-user while being delivered by a streaming provider, but is not ultimately downloaded to a physical drive on the end user's device, and may in some embodiments also include "progressive downloading" wherein the digital media file is ultimately downloaded to a physical drive on the end user's device and the end user may begin playback of the media before the download is complete and/or live streaming. "Streaming" as used herein includes the act of sending or receiving "streaming media" as described above.

The network environment 100 includes a number of server computing systems 102a-102n (collectively 102). The server computing systems 102 include processors that execute server instructions (i.e., server software) stored on computer-readable storage media to provide server functions in the network environment 100. For example, the server computing systems 102 may serve files and stream multimedia content, including, but not limited to, Web pages, advertisements, digital video and audio, images, etc., stored in one or more databases or other computer-readable storage media 104a-104n (collectively 104).

The network environment 100 includes a number of client computing systems 106a-106n (collectively 106) selectively communicatively coupled to one or more of the server computing systems 102 via one or more communications networks 108. The client computing systems 106 include one or more processors that execute one or more sets of communications instructions (e.g., browser instructions and streaming media players) stored on any of a variety of non-transitory computer-readable storage media 110 (only one illustrated in FIG. 1). The client computing systems 106 may take a variety of forms, for instance desktop, laptop or notebook personal computers, tablet computers, workstations, mini-computers, mainframe computers, or other computational devices with microprocessors or microcontrollers which are capable of networked communications. The client computing systems 106 may be communicatively coupled to the rest of the network 108 via wired, wireless or a combination of wired and wireless communications channels.

The network environment 100 includes a number of telecommunications devices 111 (only one illustrated). Such telecommunications devices 111 may, for example, take the form of Internet or Web enabled cellular phones (e.g., iPHONE®). The network environment 100 also includes a number of personal digital assistant (PDA) devices 112 (only one illustrated). Such PDA devices 112 may, for example, take the form of Internet or Web enabled PDAs or tablet computers (e.g., iPHONE®, iPAD®, TREO®, BLACKBERRY®), which may, for example, execute a set of browser instructions or program. The network environment 100 may include any number of a large variety of other devices that are capable of some type of networked communications. The telecommunications devices 110, PDA devices 112, as well as any other devices, may be communicatively coupled to the rest of the network 108 via wired, wireless or a combination of wired and wireless communications channels.

The one or more communications networks 108 may take a variety of forms. For instance, the communications networks 108 may include wired, wireless, optical, or a combination of wired, wireless and/or optical communications links. The one or more communications networks 108 may include public networks, private networks, unsecured networks, secured networks or combinations thereof. The one or more communications networks 108 may employ any one or more communications protocols, for example TCP/IP protocol, UDP protocols, IEEE 802.11 protocol, real-time transfer protocol (RTP), real-time streaming protocol (RTSP), real-time transport control protocol (RTCP) as well as other telecommunications or computer networking protocols. The one or more communications networks 108 may include what are traditionally referred to as computing networks and/or what are traditionally referred to as telecommunications networks or combinations thereof. In at least one embodiment, the one or more communications networks 108 includes the Internet, and in particular, the Worldwide Web or (referred to herein as "the Web"). Consequently, in at least one embodiment, one or more of the server computing systems 102 execute server software to serve HTML source files or Web pages and/or streaming media content 114a-114d (collectively 114), and one or more client computing systems 106, telecommunications devices 110 and/or PDAs 112 execute browser software to request and display HTML source files or Web pages 114 including streaming media content.

The network environment 100 includes an interactive system for streaming multiple different media content in a digital container or media container. A digital container (also referred to as a wrapper) is a meta-file format whose specification describes how different data elements and metadata coexist in a computer file. The digital container may be used to identify and interleave different data types. Many digital containers support multiple audio and video streams, subtitles, chapter information, and metadata (tags) along with the synchronization information needed to play back the various streams together. For example, the digital container file header, most of the metadata and the synchronization chunks are specified by the digital container format. The digital container holds a single or multiple assets (i.e., media files and/or links) including media files in various formats such as Joint Picture Expert JPEG format and Adobe FLV and F4V formats. The Adobe SWF file can contain animations or applets of varying degrees of interactivity and function. Originally, the term SWF was used as an abbreviation for ShockWave Flash. This usage was changed to Small Web Format to eliminate confusion with a different technology, Shockwave, from which SWF was derived. However, other such digital container formats may be used.

The digital container may be configured such that its contents are configured to be displayed on a user interface (e.g., in an advertising unit space on a Web page or in another defined area on a Web page). The interactive system for streaming multiple different media content in a digital container may include one or more server computing systems 102, databases 104 and one or more client systems 106, telecommunications devices 111, and/or PDA devices 112.

The one or more server computing systems 102 execute instructions stored on non-transitory computer-readable storage media that cause the server computing systems 102 to provide streaming of multiple different media content in a digital container displayed on one or more client systems 106, telecommunications devices 111, and/or PDA devices 112, and provide communications during or in connection with such services to and between one or more client systems 106, telecommunications devices 111, and/or PDA devices 112. For instance, one or more server computing systems 102 may provide streaming media content to one or more client systems 106 to be displayed within a Web page at the request over the Web by the one or more server computing systems 102 or by one or more client systems 106.

The instructions may also cause the one or more server computing systems 102 to select particular streaming media content to provide to one or more client systems 106, telecommunications devices 111, and/or PDA devices 112 based on particular criteria such as, for example, an IP address or location of the one or more client systems 106, telecommunications devices 111, and/or PDA devices 112.

Although not required, the embodiments will be described in the general context of computer-executable instructions, such as program application engines, objects, or macros stored on computer- or processor-readable storage media and executed by a computer or processor. Those skilled in the relevant art will appreciate that the illustrated embodiments as well as other embodiments can be practiced with other affiliated system configurations and/or other computing system configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or acts are performed by remote processing devices, which are linked through a communications network. In a distributed computing environment, program engines may be located in both local and remote memory storage devices.

FIG. 2 shows an electronic commerce environment 200 comprising a streaming media and ad server computer system 102, a Web server computer system 262, example client A computer system 264 and example client B computer system 266, communicatively coupled by one or more communications channels, for example one or more local area networks (LANs) 208 or wide area networks (WANs) 210 that may be part of or connect to network 108. For example, the server computing systems 102 of FIG. 1 may include the streaming media and ad server computer system 102 and the Web server computer system 262. Likewise, the number of client computing systems 106a-106n (collectively 106), one or more client systems 106, telecommunications devices 111, and/or PDA devices 112 of FIG. 1 may include the example client A computer system 264 and example client B computer system 266.

The Web server computer system 262 may include those computer systems that host and serve various Web pages and Web sites, including those of publishers, advertisers, companies and individuals. The example client A computer system 264 and example client B computer system 266 may include any user computer system having a Web browser on which Web sites, Web pages and/or Web applications are displayed. Such Web sites, Web pages and/or Web applications may include those hosted and/or served by Web server computer system 262. Streaming media and ad server computer system 102 may include those computer systems that store and/or serve multimedia content (e.g., digital audio, video and images) to be displayed within Web pages or within interfaces of other applications, including those various Web pages and Web sites of publishers, advertisers, companies and individuals hosted and/or served by the Web server computer system 262 or other computer systems accessible via one or more local area networks (LANs) 208 or wide area networks (WANs) 210 that may be part of network 108.

The streaming media and ad server computer system 202 will at times be referred to in the singular herein, but this is not intended to limit the embodiments to a single device since, in typical embodiments, there may be more than one streaming media and ad server computer system or devices involved, or there may be multiple different computing systems that each store and/or serve different items (e.g., an ad server separate from a streaming media server, etc.) Unless described otherwise, the construction and operation of the various blocks shown in FIG. 2 are of conventional design. As a result, such blocks need not be described in further detail herein, as they will be understood by those skilled in the relevant art.

The streaming media and ad server computer system 202 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the streaming media and ad server computer system 202, such as during start-up.

The streaming media and ad server computer system 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a digital video discs ("DVD"), while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program engines and other data for the streaming media and ad server computer system 202. Although the depicted streaming media and ad server computer system 202 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, compact discs ("CD"), Bernoulli cartridges, RAMs, ROMs, smart cards, solid state drives, etc.

The streaming media and ad server computer system 202 may include a network interface 260 operably coupled to the system bus 216. The network interface 260 may, for example, include one or more modems 252 and/or one or more Ethernet cards or other types of communications cards or components 254 for enabling communications via one or more local area networks (LANs) 208 or wide area networks (WANs) 210.

Program engines can be stored in the system memory 214, such as an operating system 236, one or more application programs 238, other programs or engines 240 and program data 242. Application programs 238 and video conversion and steaming modules 240 may include instructions that cause the processor(s) 212 to convert various media files to desired formats and automatically provide streaming media content to and between one or more Web server computer systems 262, client A computer system 264, and/or client B computer system 266. Application programs 238 and video conversion and steaming modules 240 may include computer executable instructions and functionality to provide such streaming content services including, but not limited to, those of Macromedia Communication Server, Apple Quicktime Streaming Server, Helix Universal Server, etc., (available from Adobe, Apple, and RealNetworks, respectively) and provide streaming media content in one or more various streaming media formats, including, but not limited to, Windows Media, Real Media, Quicktime, MPEG-4, or other modern formats. Application programs 238 and video conversion and steaming modules 240 may include computer executable instructions and functionality to deliver such streaming media content over the LAN 208 or WAN 210 using one or more, or a combination of one or more network protocols including, but not limited to, hypertext transfer protocol (HTTP), TCP/IP protocol, UDP protocols, IEEE 802.11 protocol, real-time transfer protocol (RTP), real-time streaming protocol (RTSP), real-time transport control protocol (RTCP), as well as other telecommunications or computer networking protocols.

Application programs 238 and video conversion and steaming modules 240 may also include instructions for handling security such as password or other access protection and communications encryption and also enable access and exchange data with sources such as corporate intranets, extranets, or other networks as described below, as well as other server applications on server computing systems such as those discussed further below. The system memory 214 may also include analytics modules or programs, for example analytics module 244, for configured to analyze user behavior and interactions with Web sites and Web pages on which the streaming media content is provided and with which users of client A computer system and client B computer system interact.

While shown in FIG. 2 as being stored in the system memory 214, the operating system 236, application programs 238, video conversion and streaming modules 240, program data 242 and analytics modules 244 can be stored on the hard disk 226 of the hard disk drive 224, the optical disk 232 of the optical disk drive 228 and/or the magnetic disk 234 of the magnetic disk drive 230.

An operator can enter commands and information into the streaming media and ad server computer system 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The streaming media and ad server computer system 202 can include other output devices, such as speakers, printers, etc.

The streaming media and ad server computer system 202 can operate in a networked environment using logical connections to one or more remote computers and/or devices as described above with reference to FIG. 1. For example, the streaming media and ad server computer system 202 can operate in a networked environment using logical connections to one or more Web server computer systems 262, client A computer system 264 and/or client B computer system 266. Communications may be via a wired and/or wireless network architecture, for instance wired and wireless enterprise-wide computer networks, intranets, extranets, and the Internet. Other embodiments may include other types of communications networks including telecommunications networks, cellular networks, paging networks, and other mobile networks.

The Web server computer system 262 may take the form of a conventional mainframe computer, mini-computer, workstation computer, personal computer (desktop or laptop). The Web server computer system 262 may include a processing unit 268, a system memory 269 and a system bus (not shown) that couples various system components including the system memory 269 to the processing unit 268. The Web server computer system 262 will at times be referred to in the singular herein, but this is not intended to limit the embodiments to a single Web server computer system 262 since in typical embodiments, there may be more than one Web server computer system 262 or other device involved. Non-limiting examples of commercially available computer systems include, but are not limited to, an 80.times.86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the Web server computer system 262 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the peripheral computing system 114, such as during start-up.

The Web server computer system 262 may also include one or more media drives 273 (e.g., a hard disk drive, magnetic disk drive, and/or optical disk drive) for reading from and writing to computer-readable storage media 274 (e.g., hard disk, optical disks, and/or magnetic disks). The computer-readable storage media 274 may, for example, take the form of removable media. For example, hard disks may take the form of Winchester drives, optical disks can take the form of DVDs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program engines and other data for the Web server computer system 262. Although described as employing computer-readable storage media 274 such as hard disks, optical disks and magnetic disks, those skilled in the relevant art will appreciate that Web server computer system 262 may employ other types of computer-readable storage media that can store data accessible by a computer, such as magnetic cassettes, flash memory cards, compact discs ("CD"), Bernoulli cartridges, RAMs, ROMs, smart cards, solid state drives, etc.

Program engines, such as an operating system, one or more application programs, other programs or engines and program data, can be stored in the system memory 269. Program engines may include instructions for handling security such as password or other access protection and communications encryption. The system memory 269 may also include communications and server programs, for example a Web server that permits the Web server computer system 262 to host and serve Web sites, Web pages and Web applications and also access and exchange data with sources such as corporate intranets, extranets, or other networks as described below, as well as other server applications on server computing systems such as those discussed further below.

While described as being stored in the system memory 269, the operating system, application programs, other programs/engines, program data and/or browser can be stored on the computer-readable storage media 274 of the media drive(s) 273. An operator can enter commands and information into the Web server computer system 262 via a user interface 275 through input devices such as a touch screen or keyboard 276 and/or a pointing device 277 such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The Web server computer system 262 can include other output devices, such as speakers, printers, etc.

The Web server computer system 262 includes instructions stored in non-transitory computer-readable storage media that cause the processor(s) of the Web server computer system 262 to host Web sites, Web pages and/or Web applications and serve Web pages and/or Web applications in response to requests from various clients over the LAN 208 or WAN 210, including requests from client A computer system 264 and client B computer system 266. The Web server computer system 262 includes instructions stored in non-transitory computer-readable storage media that cause the processor(s) of the Web server computer system 262 to request ads and/or streaming media from streaming media and ad server computer system 202 and include (directly or indirectly) such content within the Web pages and/or Web applications in response to requests (e.g., HTTP requests) from various clients over the LAN 208 or WAN 210 for such Web pages and/or Web applications.

The client A computer system 264 may have identical or similar components to the previously described computer systems, for example a processing subsystem 280 including one or more non-transitory processor and computer-readable memories, a media subsystem including one or more drives and computer-readable storage media, and one or more user interface subsystems 282 including one or more keyboards, keypads, displays, pointing devices, graphical interfaces and/or printers.

The client A computer system 264 includes program instructions stored in non-transitory computer-readable storage media such as those program instructions of a Web browser 284 configured to play streaming audio or video.

The browser 284 in the depicted embodiment is markup language based, such as Hypertext Markup Language (HTML5), Extensible Markup Language (XML) or Wireless Markup Language (WML), and operates with markup languages that use syntactically delimited characters added to the data of a document to represent the structure of the document. The browser 284 may include functionality such as a plug-in or other feature to play streaming media content included in such documents including, but not limited to, content received directly or indirectly from streaming media and ad server computer system 202 and/or Web server computer system 262 in one or more various formats, including, but not limited to, Windows Media, Real Media, Quicktime, MPEG-4, or other modern file formats. Streaming media and ad server computer system 202 may be configured to provide such streaming content services including, but not limited to, those of Macromedia Communication Server, Apple Quicktime Streaming Server, Helix Universal Server, or any of several next-gen streaming technologies. The browser 284 may include functionality to receive such streaming media content over the LAN 208 or WAN 210 using one or more, or a combination of one or more network protocols including, but not limited to, hypertext transfer protocol (HTTP), TCP/IP protocol, UDP protocols, IEEE 802.11 protocol, real-time transfer protocol (RTP), real-time streaming protocol (RTSP), real-time transport control protocol (RTCP), as well as other telecommunications or computer networking protocols. A number of Web clients or browsers are commercially available such as those from Mozilla, Google and Microsoft.

The client B computer system 266 may have identical or similar components to the previously described computer systems, for example a processing subsystem 286 including one or more non-transitory processor and computer-readable memories, a media subsystem 288 including one or more drives and computer-readable storage media, and one or more user interface subsystems 290 including one or more keyboards, keypads, displays, pointing devices, graphical interfaces and/or printers.

For example, the client B computer system 266 may include program instructions stored in non-transitory computer-readable storage media such those program instructions of a Web browser 290 configured to play streaming audio or video similar to that of Web browser 284 of client A computer system 264 described above. Although there are only two example client computer systems depicted in FIG. 2, there may be fewer or more such client computer systems operably connected to LAN 208 and/or WAN 210 in various other embodiments.

FIGS. 3A-3C are diagrams of streaming media containers 302, 304 and 306 of various example configurations, according to different illustrated embodiments. Streaming media containers 302, 304 and 306A are digital containers (also referred to as a wrapper). A digital container is a meta-file format whose specification describes how different data elements and metadata coexist in a computer file. The digital container may be used to identify and interleave different data types. Many digital containers support multiple audio and video streams, subtitles, chapter information, and metadata (tags) along with the synchronization information needed to play back the various streams together. For example, the digital container file header, most of the metadata and the synchronization chunks may be specified by the digital container format. In one example embodiment, the digital container may be an Adobe® Flash Video container for video and/or audio from Adobe Systems. The digital container holds a single or multiple assets (i.e., media files and/or links) including media files in various formats such as Joint Picture Expert JPEG format and Adobe FLV and F4V formats, and is then wrapped again in an Adobe® Flash SWF file. The Adobe® SWF file may contain animations or applets of varying degrees of interactivity and function. Originally, the term SWF was used as an abbreviation for ShockWave Flash. This usage was changed to Small Web Format to eliminate confusion with a different technology, Shockwave, from which SWF was derived. However, other such digital container formats may be used.

In some embodiments, a streaming media container may be configured such that its contents are configured to be displayed on a user interface of a computing system. For example, contents of a streaming media container (e.g., streaming media container 302) may be displayed on a Web page visited and called up by the client A computer system 264 or client B computer system 266 of FIG. 2 and delivered by the Web server computer system 262 of FIG. 2. In some embodiments, the streaming media container 302 comprises a graphical user interface object 310 configured to display a plurality of miniaturized video players 308a, 308b, 308c, 308d, 308e and 308f contained within an area of the object 310. In other embodiments, the streaming media container 302 comprises a graphical user interface object 310 configured to display only one miniaturized video player (e.g., miniaturized video player 308a) contained within an area of the object 310. In one embodiment, each of the plurality of miniaturized video players 308a, 308b, 308c, 308d, 308e and 308f is approximately 1.7 cm by 2.8 cm. However, different sizes of miniaturized video players may be used depending on one or more of: video format and system requirements, advertising unit requirements, network capabilities, and available network bandwidth. Other embodiments include fewer or more miniaturized video players within the streaming media container and/or include a plurality of miniaturized video players that may be seen by a user scrolling through the plurality of miniaturized video players within the streaming media container 302. In some embodiments, the streaming media container 302 may include other user interface controls (e.g., a volume control, a fast-forward control, a pause control, a rewind control, a scrolling control, Web links, buttons, etc.) and/or other user selectable icons or controls related or unrelated to the plurality of miniaturized video players 308a, 308b, 308c, 308d, 308e and 308f.

Each of the miniaturized video players 308a, 308b, 308c, 308d, 308e and 308f contained within the area of the object 310 is configured to display a user-selectable icon, such as a thumbnail image or video frame (e.g., an initial video frame) of, related to, or associated with a dynamically linked or embedded video and/or audio content file. The streaming media container 302 is configured to recognize a position of a pointer or cursor over individual ones of the miniaturized video players 308a, 308b, 308c, 308d, 308e and 308f, (i.e., a cursor-over action). On touch-screen devices the streaming media container 302 may be configured to recognize a touch action or other movement over individual ones of the miniaturized video players 308a, 308b, 308c, 308d, 308e and 308f. In other embodiments, the streaming media container 302 may be configured to recognize other types of selections by a user including, but not limited to: a mouse click, a button press, a double-click, stylus tap, icon drag, swipes, voice activation, and other user interface selection techniques. Upon the recognition of a position of a pointer or cursor over individual ones of the miniaturized video players 308a, 308b, 308c, 308d, 308e and 308f, the streaming media container 302 is configured to stream video and/or audio content within the area on the container 302 of user-selectable icon of the individual miniaturized video player over which the cursor was recognized. For user devices including a touch screen, the streaming media container 302 may be configured to stream video and/or audio content within the area on the container 302 of a user-selectable icon of the individual miniaturized video player that is touched by the user. In some embodiments, the streaming audio and video files may be stored on, and the streaming of the video and/or audio may be controlled by or though, the streaming media and ad server computer system 202 of FIG. 2 and/or the Web server computer system 262.

In particular, a user need not click individual video files or wait for each video file to load within a player, rather the video associated with the individual player streams immediately upon a cursor-over action. A cursor-over action is when a user moves a cursor or pointer over, or otherwise hovers on (i.e., hovers the cursor or pointer over or on) an icon. For example, if a user performs a cursor-over action on the icon displayed by or on miniaturized video player 308b, this action will trigger a streaming video to immediately begin to play within the miniaturized video player 308b that is associated with the thumbnail image or video frame displayed on or by the miniaturized video player 308b. In some embodiments, this may be performed by a request for the streaming video or audio that is automatically sent to the streaming media and ad server computer system 202 of FIG. 2 upon the cursor-over action. In some embodiments, the size of the frames of the streaming video being played by the miniaturized video player 308*b* will be larger than the size of the associated thumbnail image or video frame displayed on or by the miniaturized video player 308*b*.

One or more of the miniaturized video players 308*a*, 308*b*, 308*c*, 308*d*, 308*e* and 308*f* may be configured to play a video preview of a video program upon the cursor-over action on the user-selectable icon and then play the full video program upon an additional indication of selection of the icon that is different than the cursor-over action. For example, if a user moves the cursor over miniaturized video player 308*a*, a video or audio preview may begin to play. If the user then clicks a mouse button or performs some other interaction with the container 302 while the cursor is still over the miniaturized video players 308*a*, then the full video program associated with the preview may begin to play. In this instance, various actions may instead or also occur, including, but not limited to, a different larger video player being opened to play the full video program, another Web page being activated or displayed, an advertisement being displayed, an offer being made, additional information being displayed, a message or email being sent, the user action being tracked, etc.

Also, in some embodiments, if a user ends the cursor-over action by moving the cursor or pointer outside the area of the miniaturized video player 308*a*, the currently streaming video will be paused. If the user then again moves the cursor or pointer over the miniaturized video player 308*a*, the miniaturized video player 308*a* may continue to play the video preview from the current location in playback upon the additional cursor-over action. The streaming media container 302 also includes a background area 312 which may include various other information, user-selectable controls, and/or links. For example, the background area 312 may include general promotional material, advertisements, links, offers, instructions or other information related to the streaming media content available in the container 302.

Different streaming media content may be delivered by the streaming media and ad server computer system 202 of FIG. 2 to the streaming media container 302 based upon an Internet protocol (IP) address associated with a user that selects the user-selectable icon of an individual miniaturized video player (e.g., 308*a*, 308*b*, 308*c*, 308*d*, 308*e* and 308*f*). For example, each user-selectable icon may be configured to trigger playing different streaming media content based upon a location associated with the IP address. In this regard, a user will be able to automatically receive streaming content relevant to their local area, or the area associated with their IP address, upon the cursor-over action on the user-selectable icon of an individual miniaturized video player of the streaming media container 302.

Also, in various embodiments, each user-selectable icon of an individual miniaturized video player (e.g., 308*a*, 308*b*, 308*c*, 308*d*, 308*e* and 308*f*) may be configured to trigger playing different streaming media content based upon, but not limited to, one or more of: search terms used by a user, preferences of a user, information in the background area of the container 302, a location of the container 302 on a Web page, a current date, a current time, previous streaming media played as a result of selection of one or more of the plurality of user-selectable icons, a number of times previous streaming media played as a result of selection of one or more of the plurality of user-selectable icons of an individual miniaturized video player (e.g., 308*a*, 308*b*, 308*c*, 308*d*, 308*e* and 308*f*) within the container 302, a product or service associated with the container 302, a category associated with the container 302, input indicating revenue received for a playing of particular streaming media, a daily promotion associated with an advertiser, an advertising campaign associated with an advertiser, electronically received feedback from a user, interactions with the search results of a user that performed the search, shopping habits of a user, demographic information of a user, interactions of a user with the streaming media container 302, click-through rates (CTR) of a user, advertisement impressions of a user, and account settings of a user.

Also, in some embodiments, particular streaming media content may be played within an individual miniaturized video player at different times upon selection. For example, different streaming media content may be rotated in to be played upon selection by the individual miniaturized video player, or switched, according a schedule and/or based on any combination of other criteria such as that described above. Also, different captions, text, graphics, effects and backgrounds, either integrated with or superimposed under, on or over the streaming media content may also be provided and based on different schedules, particular content being displayed and different criteria such as that described above. The different captions, text, graphics, effects and backgrounds may be received as part of the streaming media content or added at a later time to be displayed with the streaming media content. The caption may be related to the streaming video content currently being played in the individual miniaturized video player. For example, streaming video content for a piece of real estate being played in a single individual miniaturized video player may have a caption explaining the number of rooms, description of the property, etc.

The streaming media containers 302, 304 and 306 may be configured such that their contents are configured to fit within a defined area on a Web page. Each streaming media container 302, 304 and 306 may be embedded on a Web page or other user interface. In instances where the streaming media container is configured such that its contents are configured to be displayed within an area on an interface of a standard size, the streaming media containers 302, 304 and 306 may conform to the standard size. Various models of advertising and generating ad revenue may be implemented technically and/or used in conjunction with the streaming media containers 302, 304 and 306. For example, an owner or publisher of a Web site may sell the right to different entities to present particular streaming media content within one or more of the miniaturized video players 308*a*, 308*b*, 308*c*, 308*d*, 308*e* and 308*f* and/or the background area 312. An advertiser may also purchase a right to the entire container 302 to present content as desired in any one or all of the miniaturized video players 308*a*, 308*b*, 308*c*, 308*d*, 308*e* and 308*f* and/or the background area 312. The advertiser may be charged based on a variety of different actions by the user including, but not limited to, a number of cursor-over actions, user click-throughs or click-through rates (CTRs), ad impressions, length of streaming media or audio play, particular ones of the miniaturized video players 308*a*, 308*b*, 308*c*, 308*d*, 308*e* and 308*f* having an associated cursor-over action or otherwise being activated, completed user transactions, etc. In some embodiments, this user interaction may be tracked and analyzed by the analytics modules 244 of the streaming media and ad server computer system 202.

Multiple videos may be delivered based upon a particular business, product or service area. For example, a real estate advertiser may include one video about a real estate broker national brand in player 308a, one video about the featured house of a real estate agent in player 308b, and one video of the agent's featured house in video player 308c. In this regard, each video player of the container 302 is capable of supplying a unique video based upon defined criteria and the streaming video container 302 is also capable of providing related videos in one or more players within the streaming video container 302. Alternatively, the local real estate agent may "own" the container 302 for insertion of videos of the agent's homes for sale based upon the search criteria of the home buyer or by the broker/brand owning the right to advertise using the container 302 by having content inserted in the container 302 related to location-based homes and agents.

In some embodiments, the streaming media container 302 may be dynamically inserted on a Web search results page (e.g., by the Web server computer system 262). Each user-selectable icon associated with the different miniaturized video players 308a, 308b, 308c, 308d, 308e and 308f may be configured to trigger playing of different streaming media content based upon search terms used in a search that produced the Web search results page. For example, miniaturized video players 308a, 308b, 308c, 308d, 308e and 308f may each be associated with a different search term and be configured to play streaming media associated with or related to the respective associated search term. Also, the search terms may be collectively analyzed to determine a general category and/or one or more specific categories, services or products. One or more of the miniaturized video players 308a, 308b, 308c, 308d, 308e and 308f may then be configured to play streaming media content related to one or more of the determined general category, specific categories, services, and/or products. In this regard, the content available in the streaming media container 302 on the Web search results page will be more likely to be relevant to the search terms and thus be more likely to cause the user to interact with the streaming media container 302. The right to advertise content within the streaming media container 302 related to particular search terms may also be purchased by advertisers. Also, one or more of miniaturized video players 308a, 308b, 308c, 308d, 308e and 308f may be configured to showcase video previews to help users find a video faster based on their search.

The streaming media container 302 may also be used in a variety of other applications and areas of media delivery. For example, the streaming media container 302 can play with a cursor-over action the latest news stories with the streaming content being syndicated across all partner Web sites simultaneously. For national news, the streaming media content may be based upon key categories associated with the streaming media container 302, associated with individual activated miniaturized video players 308a, 308b, 308c, 308d, 308e, and 308f, or be based on timestamps associated with activation of the miniaturized video players 308a, 308b, 308c, 308d, 308e and 308f. Current local news may be delivered based upon location (e.g., using the IP address of the user's device) and/or the style or other attributes of the streaming media container 302 embedded into a Web page. For example, a streaming media container 302 of the Georgia Gazette would only receive streaming media content including Georgia local news. Entertainment content may be delivered to the streaming media container 302 for preview, such as latest movies, movies in theaters, movies releasing to DVD, etc. Video game trailers may also be delivered to the streaming media container 302 based upon user preferences. For example, if a user is logged on to or otherwise identified, video trailers that the user may have interest in are delivered to the individual miniaturized video players 308a, 308b, 308c, 308d, 308e, and 308f streaming media container 302 upon a cursor-over action on a respective miniaturized video player. Previews on instructional, editorial and "how to" streaming media content may also be delivered to the streaming media container 302 to increase user engagement.

A streaming media container may have a variety of different configurations and shapes, of which a few are shown in FIGS. 3A-3C. In some embodiments, the streaming media container may have a substantially rectangular shape and may include the plurality of individual miniaturized video players 308a, 308b, 308c, 308d, 308e, and 308f located in any area within the container. For example, FIG. 3A shows the miniaturized video players 308a, 308b, 308c, 308d, 308e, and 308f formed in a horizontal row within the container 302 in what may be referred to as a "leaderboard" configuration. FIG. 3B shows the miniaturized video players 308a, 308b, 308c, 308d, 308e, and 308f formed in a vertical column within the container 304 in what may be referred to as a "skyscraper" configuration. FIG. 3C shows the miniaturized video players 308a, 308b, 308c, 308d, 308e, and 308f configured in two horizontal rows within the container 306. Other shapes of the streaming media container 302 (e.g., circle, star, other polygon, etc.) and configurations of the miniaturized video players 308a, 308b, 308c, 308d, 308e, and 308f within the streaming media container 302 are contemplated and possible. In some embodiments, the miniaturized video players 308a, 308b, 308c, 308d, 308e, and 308f may partially overlap each other.

A streaming media container of different configurations may be inserted into any variety of graphical user interfaces, including, but not limited to, different types of Web pages, interfaces of mobile device applications, and video game interfaces, etc. FIGS. 4-7 show streaming media containers of different configurations inserted into different areas on different types of Web pages.

Figure 4:
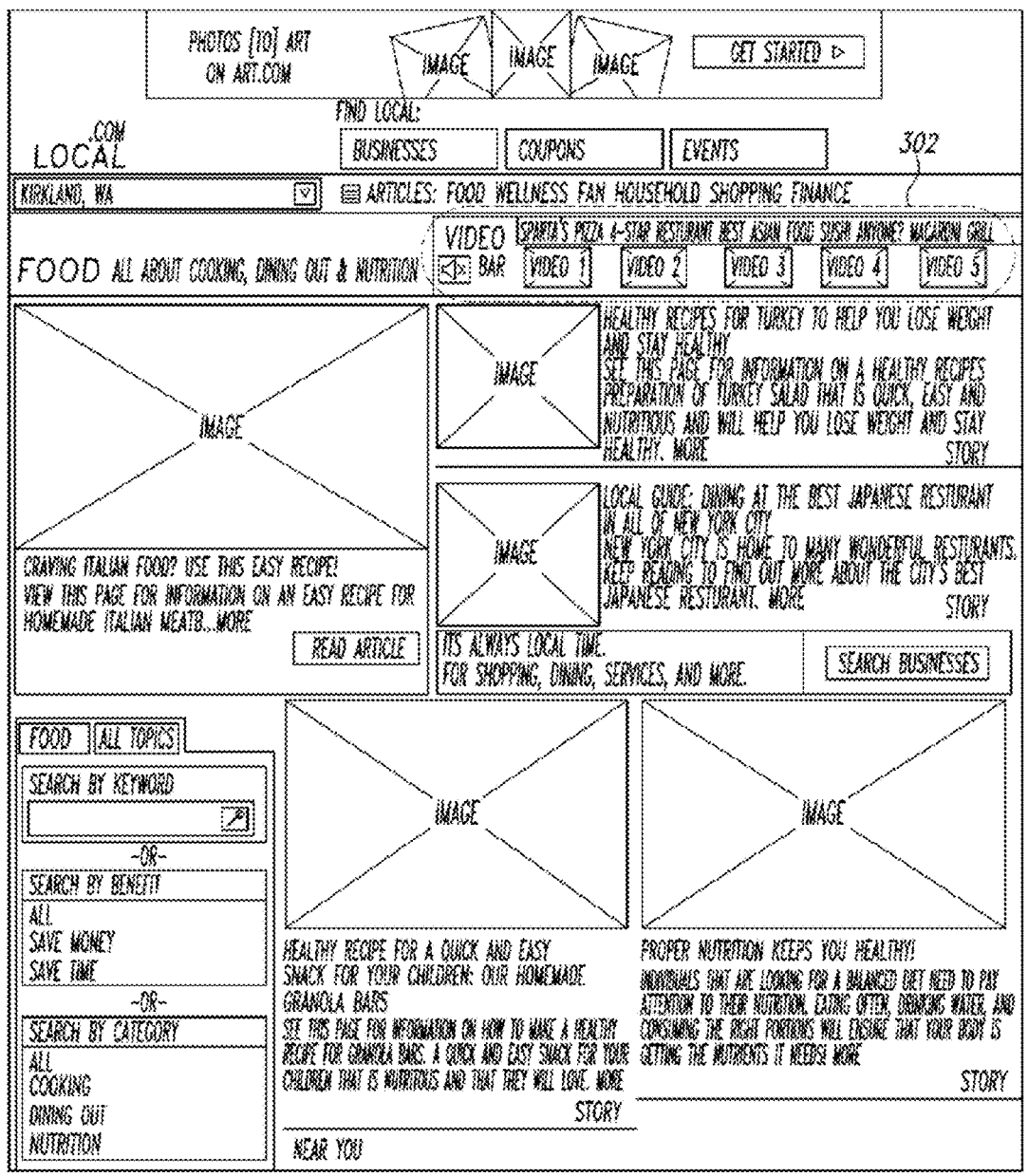
FIG. 4 is a diagram of a streaming media container such as that shown in FIG. 3A integrated into an example Web page, according to some illustrated embodiments.

For example, FIG. 4 shows streaming media container 302 in a "leaderboard" configuration located near the top of a Web page for finding businesses, products or services in the local area. For example, the streaming media container 302 may play content related to the local area associated with a user of the Web site.

Figure 5:
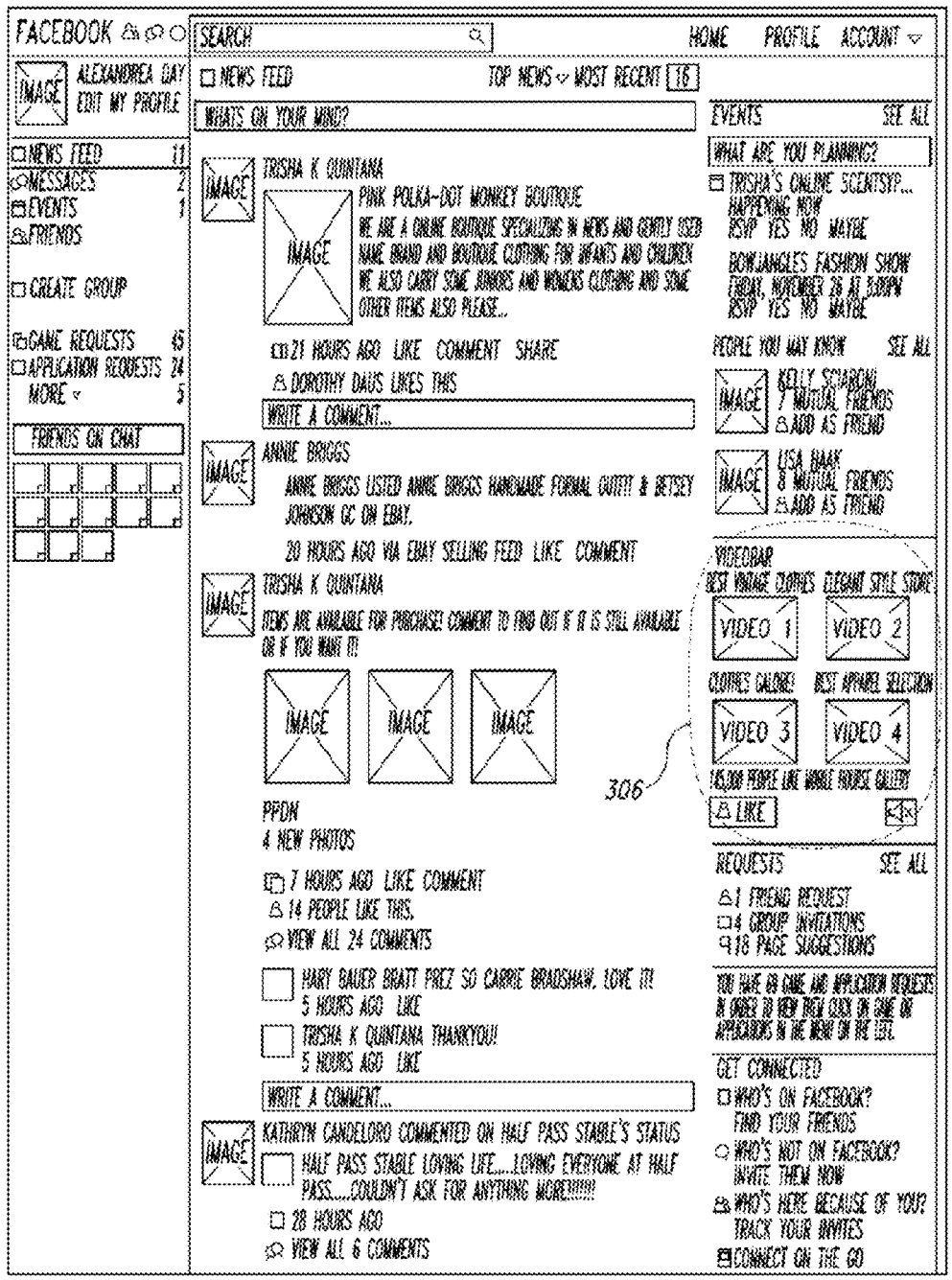
FIG. 5 is a diagram of a streaming media container such as that shown in FIG. 3C integrated into an example Web page, according to some illustrated embodiments.

FIG. 5 shows a version of streaming media container 306 with four miniaturized video players in a stacked rectangular configuration located near on the middle right-hand side of a social network Web page. For example, the streaming media container 306 may play content related to user information related to the social network account of the user. In the example shown in FIG. 5, it had been determined that, based on the user activity within the social media account and user demographic information, the user is interested in clothing. Thus, at least some of the streaming media content of the streaming media container 306 was automatically selected (e.g., by the streaming media and ad server computer system 102 shown in FIG. 2) as being related to clothing.

Figure 6:
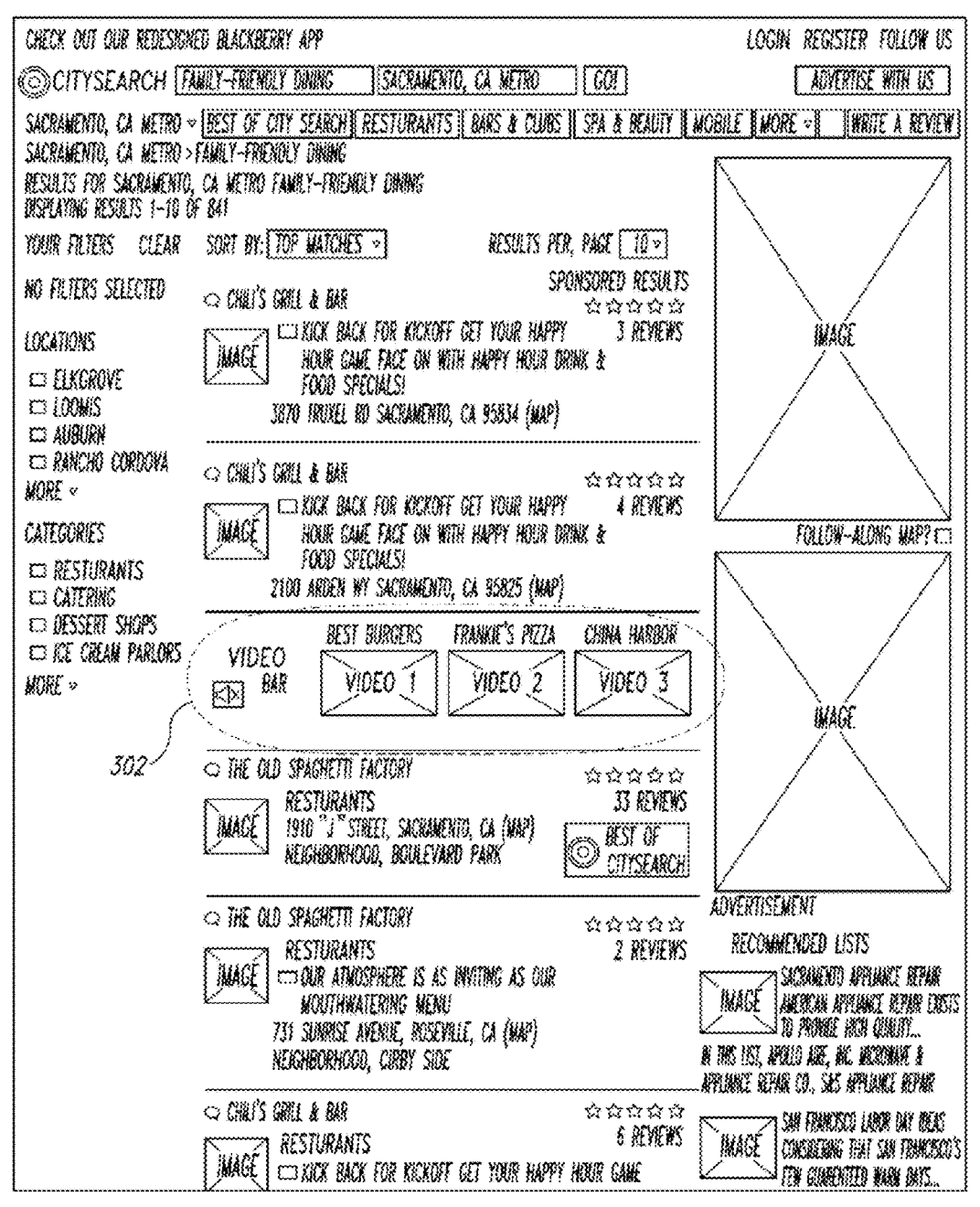

FIG. 6 shows a version of streaming media container 302 with two miniaturized video players in a horizontal row "leaderboard" configuration located near in the middle of a Web page that enables searching businesses and services in a particular selected city. For example, the streaming media container 302 may play streaming media content selected to advertise restaurants related to the "family-friendly dining" and "Sacramento" search terms entered by the user.

Figure 7:
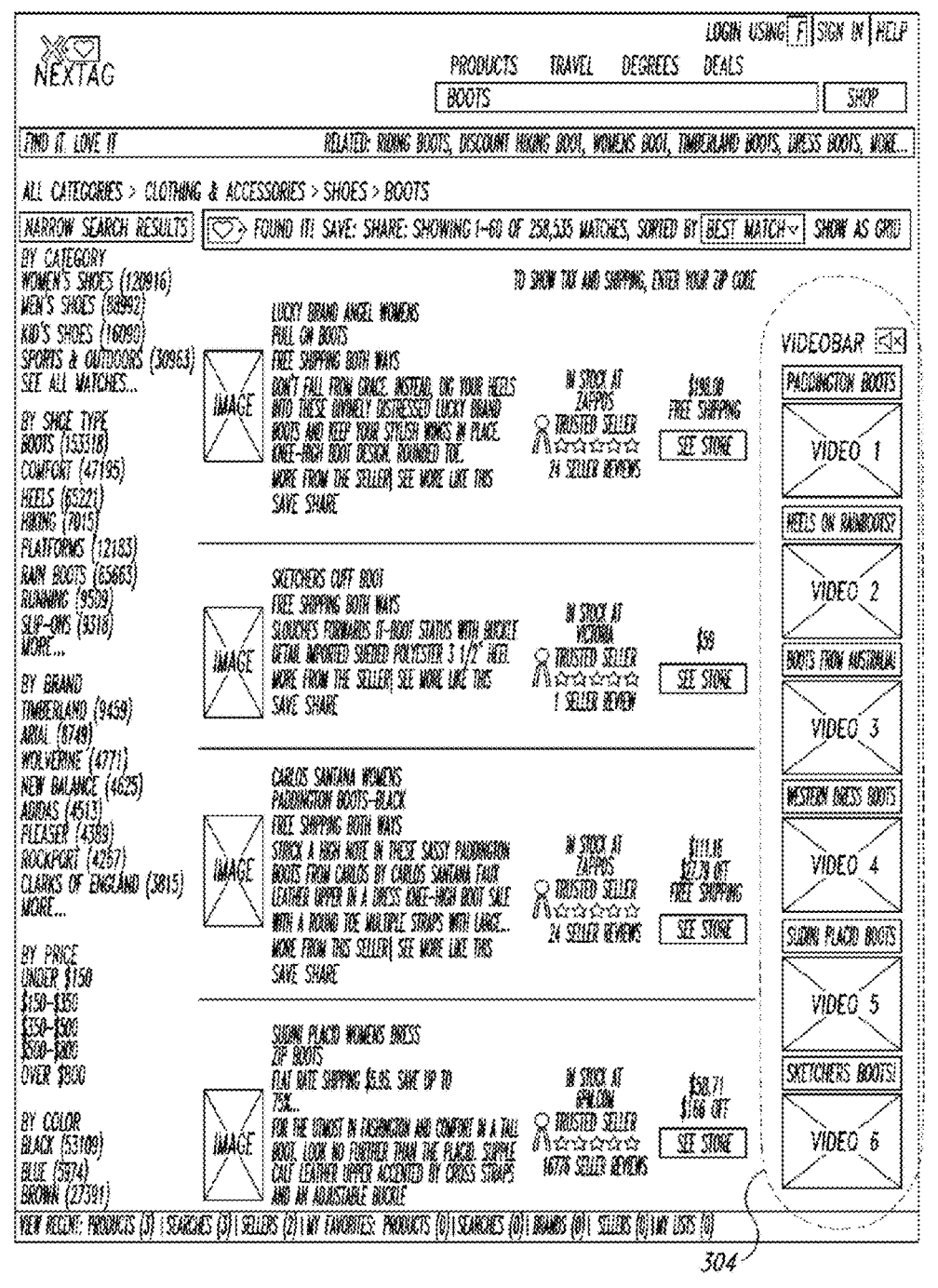

FIG. 7 shows streaming media container 304 in a vertical column "skyscraper" configuration located along the right hand side of a search results Web page of an online retailer. For example, the streaming media container 302 may play streaming media content selected to advertise products (e.g., boots) related to the "boots" search term entered by the user. In the example shown in FIG. 7, each player within the streaming media container 304 plays different streaming media related to a different type, style or brand of boot. For example, different advertisers of different specific brands of boots may purchase the right to advertise using their brand in one or more different individual miniaturized players within the same streaming media container 304.

Figure 8:
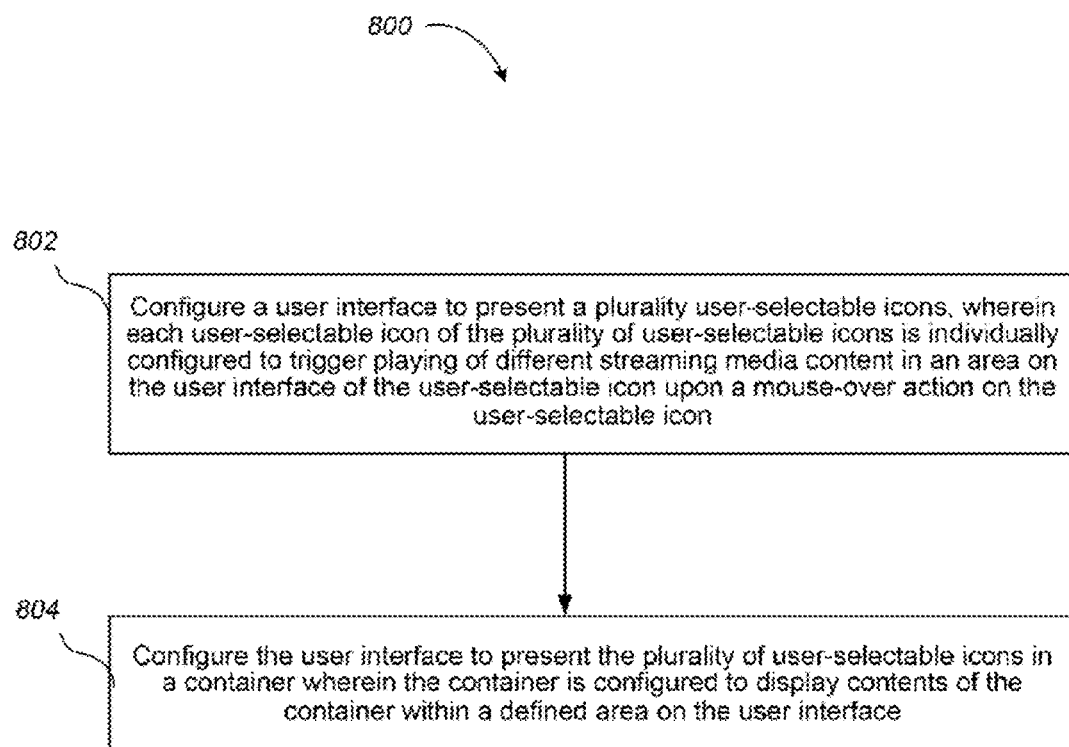
FIG. 8 is a flow diagram showing a method of configuring a user interface to stream multiple different media content upon a selection of an icon in a digital container, according to some illustrated embodiments.

FIG. 8 shows a method 800 for configuring a user interface to stream multiple different media content upon a cursor-over or hover action on an icon in a digital container, according to some illustrated embodiments.

The method 800 starts at 802, in which the Web server computer system 262 or the client A computer system 264 shown in FIG. 2 configures a user interface to present a plurality of user-selectable icons. Each user-selectable icon of the plurality of user-selectable icons is individually configured to trigger playing of different streaming media content in an area on the user interface of the user-selectable icon upon a cursor-over or hover action on the user-selectable icon.

At 804, the Web server computer system 262 or the client A computer system 264 configures the user interface to present the plurality of user-selectable icons in a container wherein the container is configured to display contents of the container within a defined area on the user interface. For example, the user-selectable icons may be those of the miniaturized video players 308a, 308b, 308c, 308d, 308e, and 308f of streaming media container 302 shown in FIG. 3A.

Figure 9:
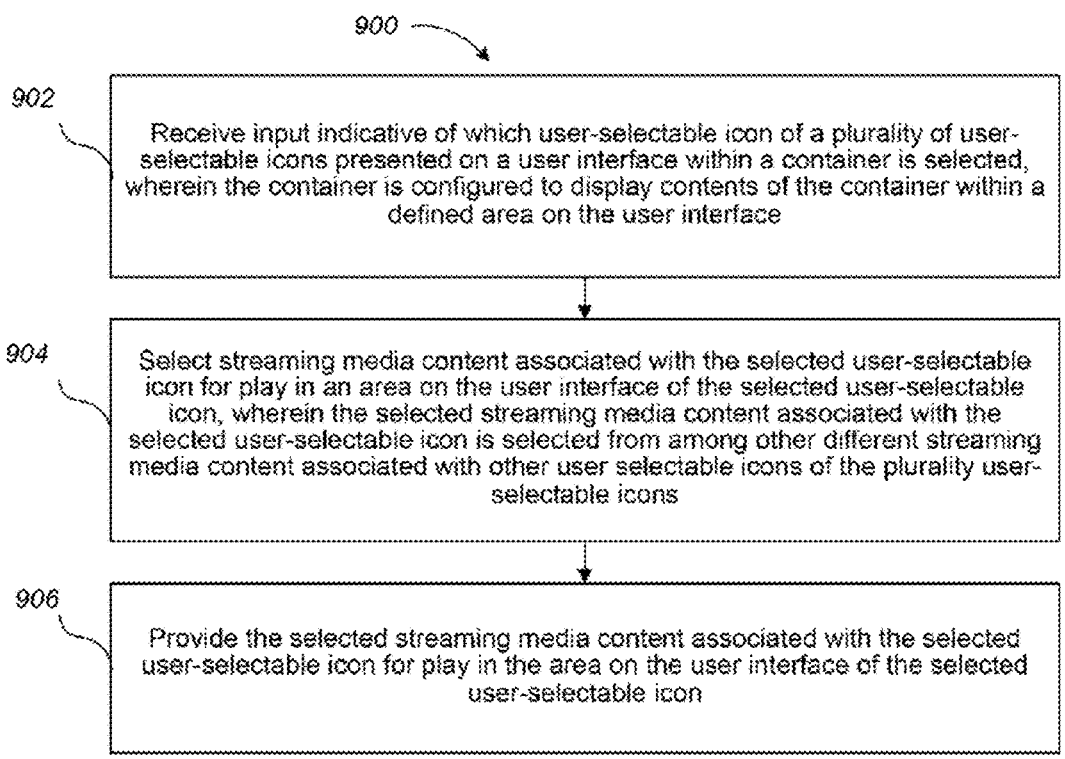
FIG. 9 is a flow diagram showing a method of providing selected streaming media based on selected icons in a digital container, according to some illustrated embodiments.

FIG. 9 shows a method 900 for providing selected streaming media based on selected icons in a digital container, according to some illustrated embodiments.

The method starts at 902, where the streaming media and ad server computer system 202 shown in FIG. 2 receives input indicative of which user-selectable icon of a plurality of user-selectable icons presented on a user interface within a container. The container may be configured to display contents of the container within a defined area on the user interface.

At 904, the streaming media and ad server computer system 202 selects streaming media content associated with the selected user-selectable icon for play in an area on the user interface of the selected user-selectable icon. The selected streaming media content associated with the selected user-selectable icon is selected from among other different streaming media content associated with other user selectable icons of the plurality of user-selectable icons. For example, the user-selectable icons may be those of the miniaturized video players 308a, 308b, 308c, 308d, 308e, and 308f of streaming media container 302 shown in FIG. 3A.

At 906, the streaming media and ad server computer system 202 provides the selected streaming media content associated with the selected user-selectable icon for play in the area on the user interface of the selected user-selectable icon. The streaming media and ad server computer system 202 may provide the selected streaming media content to the Web server computer system 262 or, in some instances, directly to the client A computer system 264.

Figure 10:
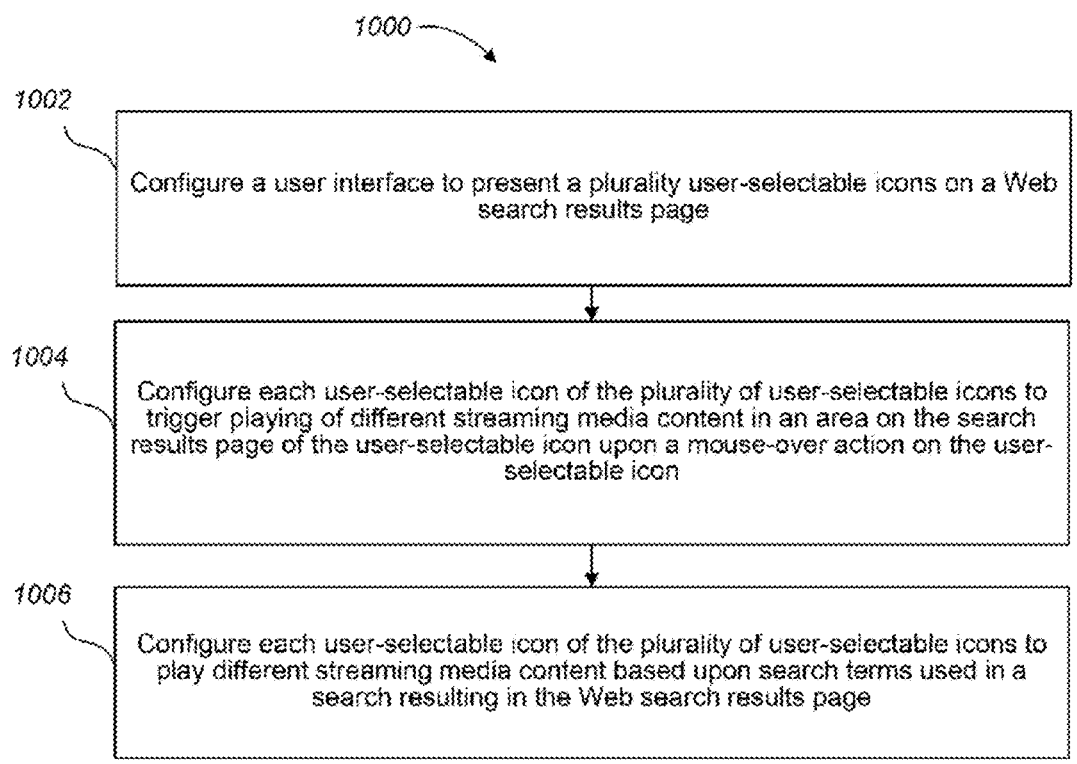
FIG. 10 is a flow diagram showing a method of providing selected streaming media based on selected icons and search terms used in a search, according to some illustrated embodiments.

FIG. 10 shows a method 1000 for providing selected streaming media based on selected icons and search terms used in a search, according to some illustrated embodiments.

The method 1000 starts at 1002, where the Web server computer system 262 or the client A computer system 264 shown in FIG. 2 configures a user interface to present a plurality of user-selectable icons on a Web search results page.

At 1004, the Web server computer system 262 or the client A computer system 264 configures each user-selectable icon of the plurality of user-selectable icons to trigger playing of different streaming media content in an area on the search results page of the user-selectable icon upon a cursor-over or hover action on the user-selectable icon. For example, the user-selectable icons may be those of the miniaturized video players 308a, 308b, 308c, 308d, 308e, and 308f of streaming media container 302 shown in FIG. 3A.

At 1006, the Web server computer system 262 or the client A computer system 264 configures each user-selectable icon of the plurality of user-selectable icons to play different streaming media content based upon search terms used in a search resulting in the Web search results page.

Figure 11:
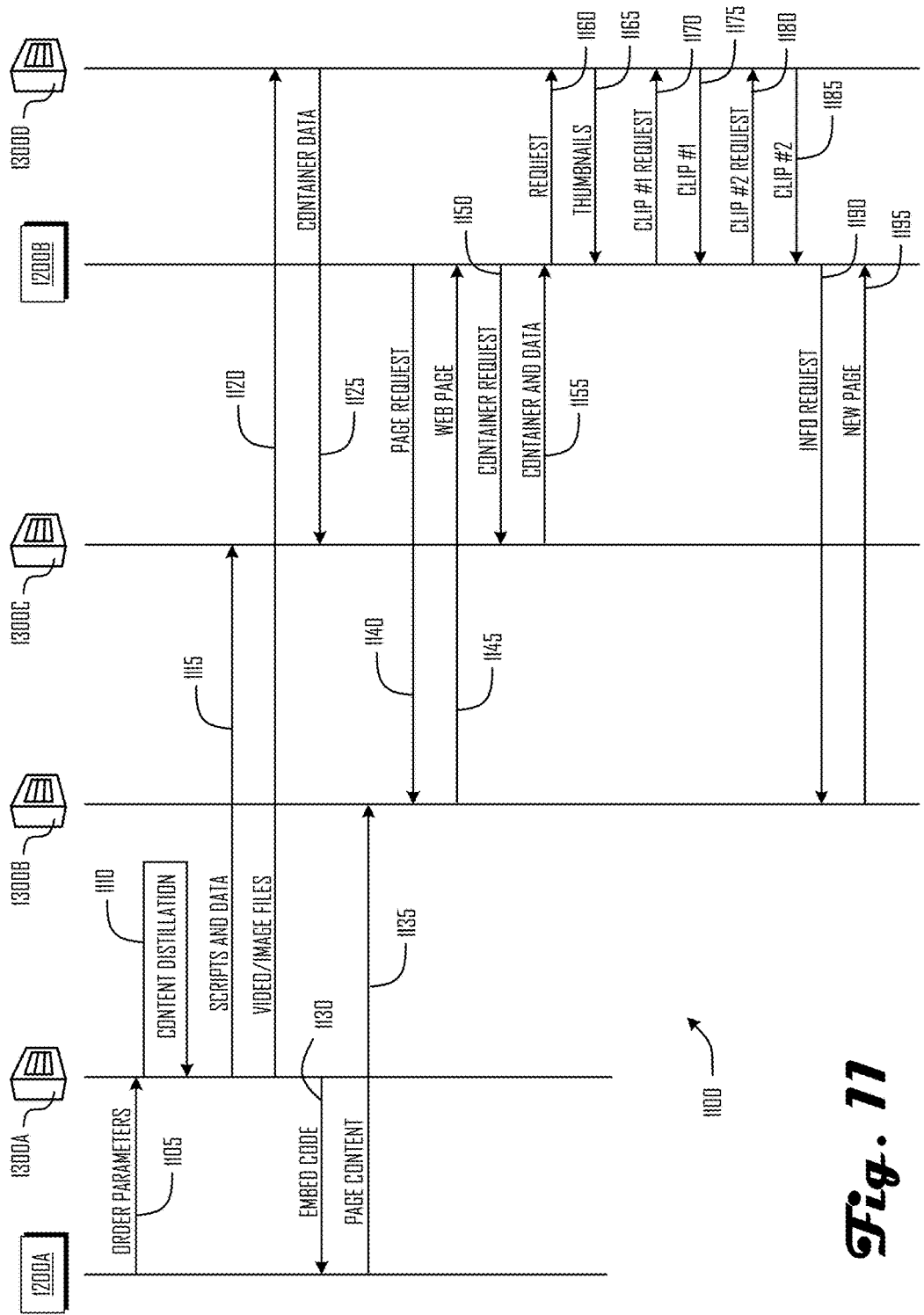
FIG. 11 illustrates an exemplary series of data handling operations as an operational flow in accordance with one or more embodiments.

FIG. 11 illustrates a dataflow schematic suitable for use with at least one embodiment. Order parameters 1105 from one or more client devices 1200A to one or more server devices 1300A may include one or more instances of works (movies or games, e.g.) including video data, of names of items, of preview types or arrangements, of spatial or temporal video preview generation, of thumbnails, captions or other metadata, or of other such parameters for which a container identified by embed code is desired. Content distillation 1110 including video transcoding occurs according to the order parameters 1105 at one or more "creation" servers 1300A based upon such parameters, including generation of scripts and data 1115 that are then provided to one or more "delivery" servers 1300C. Video/image files 1120 for use in the container(s) are provided to one or more "repository" servers 1300D at which the transcoded clips reside. Such servers provide container data 1125 back to the deliver servers 1300C as well.

Meanwhile the embed code 1130 as described below may be provided to the one or more client devices 1200A. This embed code 1130 is included the page content 1135 provided to one or more web servers 1300B, which eventually receive a page request 1140 from one or more other client devices 1200B (from a consumer, e.g.). The web page 1145 provided in response includes the embed code 1130, allowing the consumer client devices 1200B to transmit a container request 1150 for a graphical container and data 1155 by which the container at the consumer client devices 1200B is rendered. This rendering may include a request 1160 (to the one or more repository servers 1300D as shown, e.g.) for thumbnails 1165 or the like by which preview content may be surveyed.

Using this architecture, for example, a first clip request 1170 prompts a delivery of a first lithe clip 1175 soon followed by a second clip request 1180 that prompts a delivery of a second lithe clip 1185. If the preview content is well made, the consumer may then move through to the next stage by transmitting an info request 1190 (by following a target link, e.g.), in response to which web servers 1300B may respond by providing the requested primary content (to which each respective preview pertains, e.g.), optionally in a new page 1195. It will be understood, in this description, that a single machine may function as two or more of the above-described servers 1300A-D.

Figure 12:
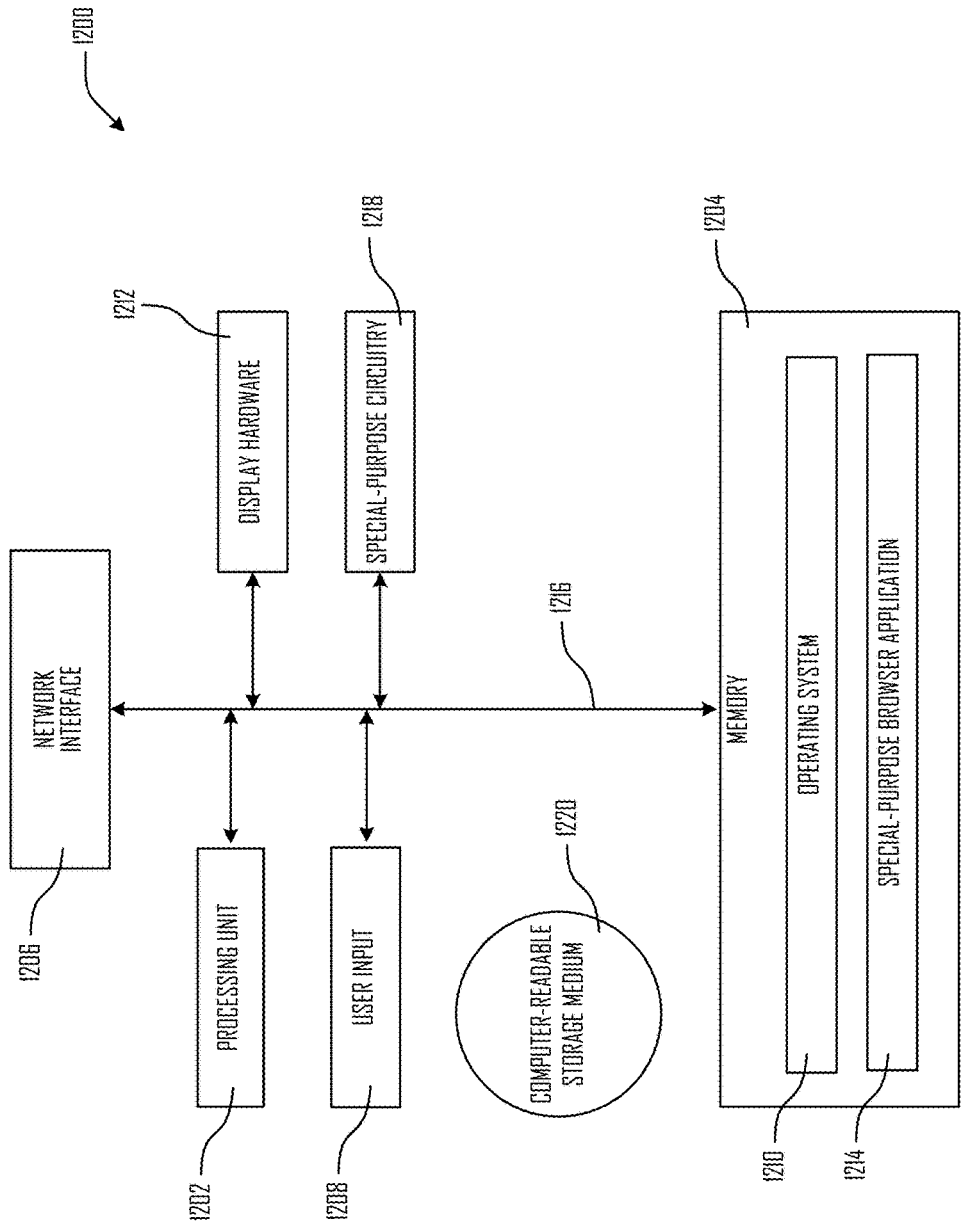
FIG. 12 illustrates an exemplary client device in accordance with one or more embodiments.

FIG. 12 illustrates several components of an exemplary mobile client device 1200. In some embodiments, client device 1200 may include many more components than those shown in FIG. 12. However, it is not necessary that all of these generally conventional components be shown in order to disclose an illustrative embodiment. As shown in FIG. 12, client device 1200 includes a data network interface 1206 for connecting to one or more networks 108.

Client device 1200 may also include one or more instances of processing unit 1202, a memory 1204, display hardware 1212, and special-purpose circuitry 1218 all interconnected along with the network interface 1206 via a bus 1216. Memory 1204 generally comprises a random access memory ("RAM"), a read only memory ("ROM"), and a permanent mass storage device, such as a disk drive.

Special-purpose circuitry 1218 may, in some variants, include some or all of the event-sequencing logic described below (with reference to FIG. 17, e.g.). Alternatively or additionally, in some variants memory 1204 may instantiate memory or local storage (in a removable chip, e.g.) as described above.

In addition, memory 1204 may also contain an operating system 1210, browser application 1214, and downloaded local app (or routines for access to a remote database). These and other software components may be loaded from a non-transitory computer readable storage medium 1220 into memory 1204 of the client device 1200 using a drive mechanism (not shown) associated with a non-transitory computer readable storage medium 1220, such as a floppy disc, tape, DVD/CD-ROM drive, flash card, memory card, removable integrated circuit, or the like. In some embodiments, software components may also be loaded via the network interface 1206, rather than via a computer readable storage medium 1220.

Figure 13:
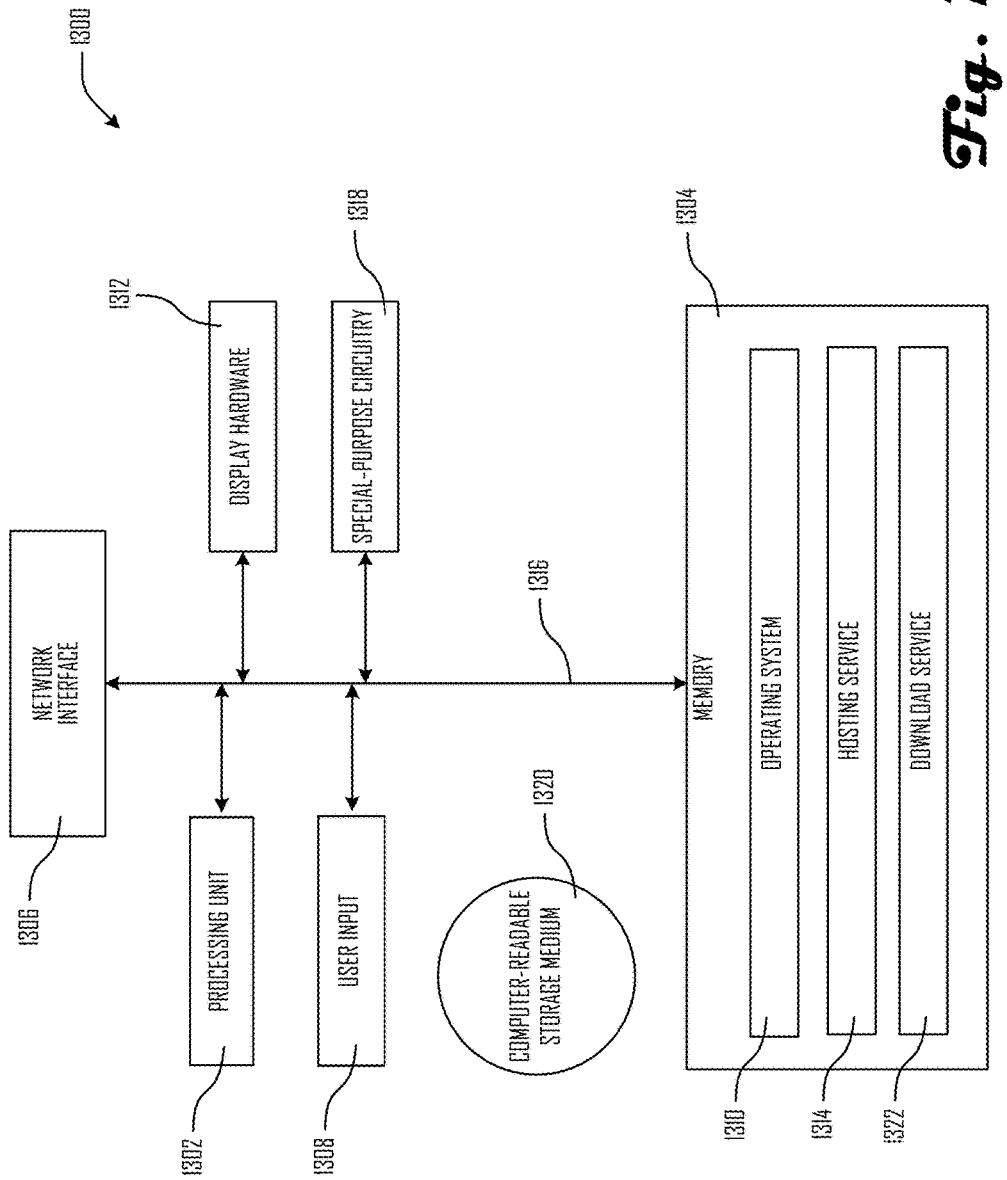
FIG. 13 illustrates an exemplary server in accordance with one or more embodiments.

FIG. 13 illustrates several components of an exemplary server 1300 as described above. In some embodiments, server 1300 may include many more components than those shown in FIG. 13. However, it is not necessary that all of these generally conventional components be shown in order to disclose an illustrative embodiment. As shown in FIG. 13, server 1300 includes a data network interface 1306 for connecting to one or more networks 108.

Server 1300 may also include one or more instances of processing unit 1302, a memory 1304, display hardware 1312, and special-purpose circuitry 1318 all interconnected along with the network interface 1306 via a bus 1316. Memory 1304 generally comprises a random access memory ("RAM"), a read only memory ("ROM"), and a permanent mass storage device, such as a disk drive.

Special-purpose circuitry 1318 may, in some variants, include some or all of the event-sequencing logic described below (with reference to FIGS. 17-18, e.g.). Alternatively or additionally, in some variants memory 1304 may instantiate memory or local storage (in a removable chip, e.g.) as described above.

In addition, memory 1304 may also contain an operating system 1310, hosting application 1314, and download service 1322 for providing apps (or routines for access to a remote database). These and other software components may be loaded from a non-transitory computer readable storage medium 1320 into memory 1304 of the server 1300 using a drive mechanism (not shown) associated with a non-transitory computer readable storage medium 1320, such as a floppy disc, tape, DVD/CD-ROM drive, flash card, memory card, removable integrated circuit, or the like. In some embodiments, software components may also be loaded via the network interface 1306, rather than via a computer readable storage medium 1320.

FIG. 14 depicts a system 1400 that includes a client device 1200. Several browser processes are instantiated, (a user-selected) one of which includes a graphical container 1408 identified by embed code 1130 that presents container data 1125 such as that described above. Thumbnails 1165 and clips 1175, 1185 are rendered successively in response to user action at device 1200. Consumer 1410 loading web page 1145, for example, may trigger a processing unit 1202 and special-purpose circuitry 1218 (as further described below, e.g.) jointly to render graphical container 1408. This can occur, for example, in a variant in which several items of preview video content are thereby presented sequentially (each for a few seconds and then down the column to the next cell, e.g.) as an automatic and conditional response to a loading of the graphical container graphical container 1408 in the absence of any further user action.

Alternatively or additionally, such special-purpose circuitry 1218 may present a first preview control 1425B identifying first video content (the movie "Inferno" as shown, e.g.) and a second preview control 1425C identifying second video content (the movie "Jason Bourne" as shown, e.g.) both simultaneously within the graphical container 1408 identified by the embed code 1130 of the web page at "instavid.com" and rendered at the client device 1200. Such special-purpose circuitry 1218 may further present the second preview control 1425C and preview video content portraying "Inferno" (covering at least some of the first preview control 1425B, e.g.) both simultaneously as a conditional response to consumer 1410 activating the first preview control 1425B (displaying "PREVIEW" or an icon/thumbnail, e.g.). This can occur, for example, in a context in which a location 1481A, duration 1482A, frame count 1483A, height 1484A, width 1485A, format identifier 1486A, or other such metadata 1480A relating to (actual primary content of) "Inferno" portrayed by the preview video content is resident (in device 1200 as a result of an info request 1190 pertaining to such primary content to web or content repository servers 1300B-C, e.g.). This can occur, for example, after as a result of such primary content having undergone transcoding (at content distillation 1110, e.g.) by which a location 1481B, duration 1482B, frame count 1483B, height 1484B, width 1485B, format identifier 1486B, or other such metadata 1480B relating to (the transcoded preview of) "Inferno" is generated in a context in which such metadata 1480B arrives at client device 1200 as "Clip #1" 1175 and in which acceptably quick previewing would otherwise require considerably greater resources.

Such special-purpose circuitry 1218 may further present the first preview control 1425B and preview video content portraying "Jason Bourne" (covering at least some of the second preview control 1425C, e.g.) both simultaneously as a conditional response to consumer 1410 activating the second preview control 1425C during or after watching the "Inferno" preview. This can occur, for example, in a context in which a location 1481C, duration 1482C, frame count 1483C, height 1484C, width 1485C, format identifier 1486C, or other such metadata 1480C relating to (actual primary content of) "Jason Bourne" portrayed by the preview video content is resident (as a result of an info request 1190 pertaining to such primary content to web or content repository servers 1300B-C, e.g.). This can occur, for example, as a result of such primary content having undergone transcoding by which a location 1481D, duration 1482D, frame count 1483D, height 1484D, width 1485D, format identifier 1486D, or other such metadata 1480D relating to (the transcoded preview of) "Jason Bourne" is generated in a context in which such metadata 1480D arrives at client device 1200 as "Clip #2" 1185 and in which acceptably quick previewing would otherwise require considerably greater resources.

Figure 15:
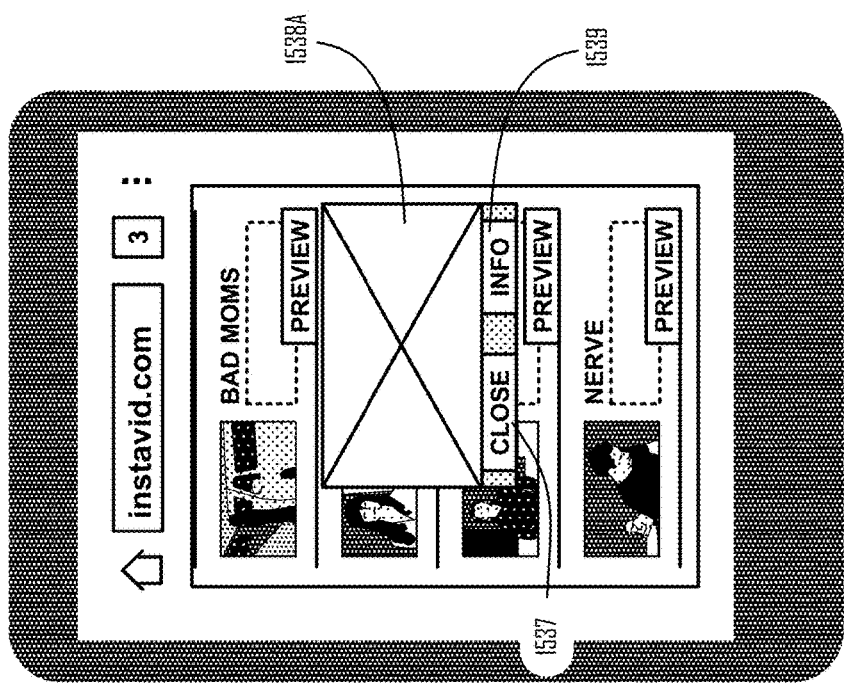
FIG. 15 illustrates a reconfiguration of the system of FIG. 14 in accordance with one or more embodiments.

FIG. 15 depicts a reconfiguration of system 1400 after the device user (consumer 1410, e.g.) has actuated preview control 1425B or otherwise allowed special-purpose circuitry 1218 to present preview video content portraying "Inferno" using one or more of location 1481B, duration 1482B, frame count 1483B, height 1484B, width 1485B, format identifier 1486B, or other such preview metadata 1480B (identifying a protocol or standard by which preview transcoding was performed upon the primary content, e.g.). An active video player 1538A is thus presenting an "Inferno" preview clip (until a close control 1537 or info control 1539 are activated or the preview clip ends, e.g.). This can occur, for example, in a context in which close control 1537 is configured to return to the configuration depicted in FIG. 14 and in which info control 1539 is configured to advance the configuration to display a new page 1195 concerning such primary content.

Figure 16:
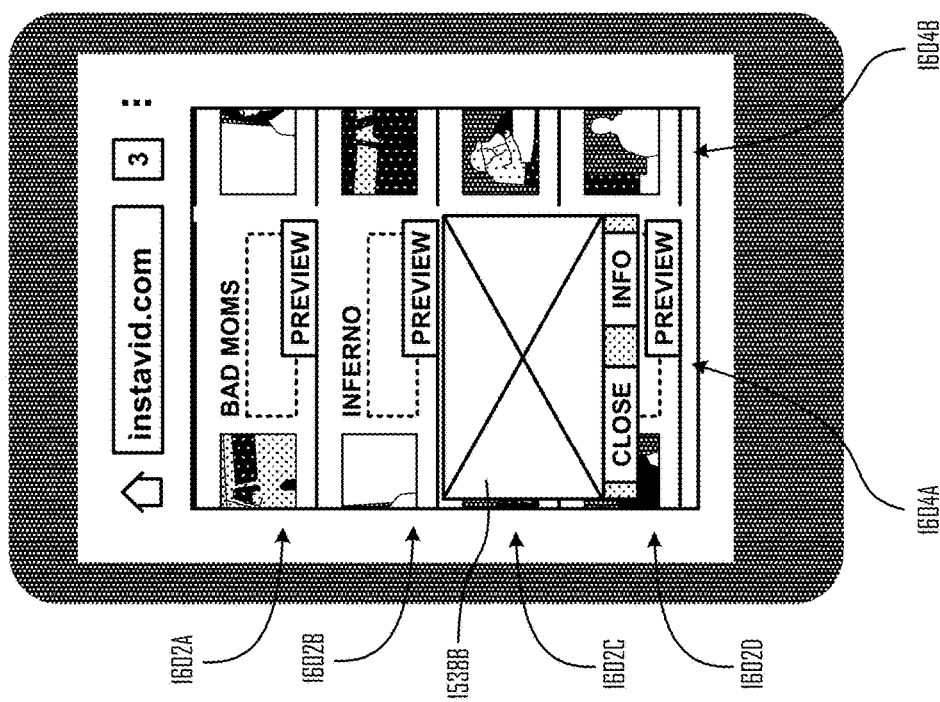
FIG. 16 illustrates another reconfiguration of the system of FIG. 14 in accordance with some embodiments, having more than one column of preview cells.

FIG. 16 depicts a variant reconfiguration of system 1400 after the device user (consumer 1410, e.g.) has actuated preview control 1425C or otherwise allowed special-purpose circuitry 1218 to present preview video content portraying "Jason Bourne" using one or more of location 1481D, duration 1482D, frame count 1483D, height 1484D, width 1485D, format identifier 1486D, or other such preview metadata 1480D (identifying a protocol or standard by which preview transcoding was performed upon the primary content, e.g.). An active video player 1538B is thus presenting a "Jason Bourne" preview clip.

An additional shift is evident in FIG. 16, relative to the single-column depictions of FIGS. 14-15. In additional to showing preview controls 1425 and other elements in several rows 1602A-D of a first column 1604A of preview cells, in fact a plurality of columns 1604 including a second column 1604B of preview cells is likewise presented. If a preview control 1425 in the preview cell of row 1602B and column 1604B is activated, for example, the active video player 1538B will stop playing the preview video content portraying "Jason Bourne" and present other content (relating to a game or other video-containing primary content susceptible of being previewed, e.g.). Preview cell arrays (having a plurality of columns and rows, e.g.) allow a user to scroll laterally or vertically (or both) even while presenting a scrolling video preview (as necessary to display all the cells, e.g.) allow an appropriate magnification even in while allowing a preview or succession of previews to proceed. This can occur, for example, in a context in which the user would otherwise be unable to view several video previews in a single minute via mobile device 1200.

FIG. 17 illustrates special-purpose transistor-based circuitry 1700—optionally implemented as an Application-Specific Integrated Circuit (ASIC), e.g.—in which some or all of the functional modules described below may be implemented. Transistor-based circuitry 1700 is an event-sequencing structure generally as described in U.S. Pat. Pub. No. 2015/0094046 but configured as described herein. Transistor-based circuitry 1700 may include one or more instances of location 1481E, duration 1482E, frame count 1483E, height 1484E, width 1485E, format identifier 1486E, or other such preview metadata 1480E relating to primary content as described above. Transistor-based circuitry 1700 may likewise include one or more instances of location 1481F, duration 1482F, frame count 1483F, height 1484F, width 1485F, format identifier 1486F, or other such preview metadata 1480F relating to preview content as described above, in a context in which instances of such preview content are generated (in a content distillation 1110 as described above, e.g.), stored (in a content repository server 1300D, e.g.), and later retrieved for and presented to a consumer surveying such preview content in a graphical container defined by an embed code and presented in a webpage as variously described herein.

Transistor-based circuitry 1700 may also include one or more instances of modules 1721 configured for local processing, for example, each including an electrical node set 1731 upon which informational data is represented digitally as a corresponding voltage configuration 1741. In some variants, moreover, an instance of modules 1721 may be configured for invoking such local processing modules remotely in a distributed implementation. Transistor-based circuitry 1700 may likewise include one or more instances of modules 1722-1724 configured for programmatic response as described below, for example, each including an electrical node set 1732-1734 upon which informational data is represented digitally as a corresponding voltage configuration 1742-1744. In some variants, an instance of modules 1722-1724 may be configured for invoking such programmatic response modules remotely in a distributed implementation.

As used herein, "processing module" refers to transistor-based circuitry that performs encoding, pattern matching, or other data-transformative operations generally as described herein. "Invocation module" refers to control circuitry that configures and triggers communication and processing modules or other event-sequencing logic generally as described herein. In light of teachings herein, those skilled in the art will be able to configure processing and implementation modules (and other modules also) within special-purpose circuitry 1218, 1318 of a single device 1200 or server 1300 or in a distributed implementation (with respective modules 1721-1724 constructed and arranged in respective systems of a data network 108, e.g.).

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any records or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

FIG. 18 illustrates an operational flow 1800 in which one or more technologies may be implemented (within or in conjunction with one or more servers 1300, e.g.). At operation 1815, a graphical container identified by an embed code is obtained in a web page at least partly presented by a mobile client device (one or more invocation or processing modules 1721 of special-purpose circuitry 1218, 1318 receiving or generating such items, e.g.). This can occur, for example, in a context in which the embed code 1130 is digitally encoded as a voltage configuration 1741 (on an electrical node set 1731, e.g.) and in which client device 1200 and server 1300 both perform an instance of operation 1815.

At operation 1825, a first preview control identifying first video content and a second preview control identifying second video content are both presented simultaneously within the graphical container identified by the embed code of the web page and rendered at the mobile client device (one or more invocation or processing modules 1722 of special-purpose circuitry 1218, 1318 presenting such an arrangement locally or remotely, e.g.). This can occur, for example, in a context in which a universal record locator (URL) of the web page is digitally encoded as a voltage configuration 1742 (on an electrical node set 1732, e.g.); in which client device 1200 and server 1300 both perform an instance of operation 1825 (via display hardware 1212 of device 1200, e.g.); and in which the result resembles what is depicted in FIG. 14.

At operation 1840, the second preview control and preview video content determined by the embed code and (the embed code triggers a request for video files) portraying the first video content that supplants at least some of the first preview control are both presented simultaneously as a conditional response to a user activation of the first preview control at the mobile client device (one or more invocation or processing modules 1723 of special-purpose circuitry 1218, 1318 presenting such an arrangement locally or remotely, e.g.). This can occur, for example, in a context in which a preview content identifier (of clip #1 request 1170, e.g.) is digitally encoded as a voltage configuration 1743 (on an electrical node set 1733, e.g.); in which client device 1200 and server 1300 both perform an instance of operation 1840 (via display hardware 1212 of device 1200, e.g.); and in which the result resembles what is depicted in FIG. 15.

At operation 1855, the first preview control and preview video content determined by the embed code and portraying the second video content that supplants at least some of the second preview control are both presented simultaneously as a conditional response to a user activation of the second preview control at the mobile client device (one or more invocation or processing modules 1724 of special-purpose circuitry 1218, 1318 presenting such an arrangement locally or remotely, e.g.). This can occur, for example, in a context in which a preview content identifier (of clip #2 request 1180, e.g.) is digitally encoded as a voltage configuration 1744 (on an electrical node set 1734, e.g.); in which client device 1200 and server 1300 both perform an instance of operation 1855 (via display hardware 1212 of device 1200, e.g.); and in which the result resembles what is depicted in FIG. 15 (insofar that the first preview video content stops and that of another row 1602B or column 1604B starts, e.g.).

Figure 19:
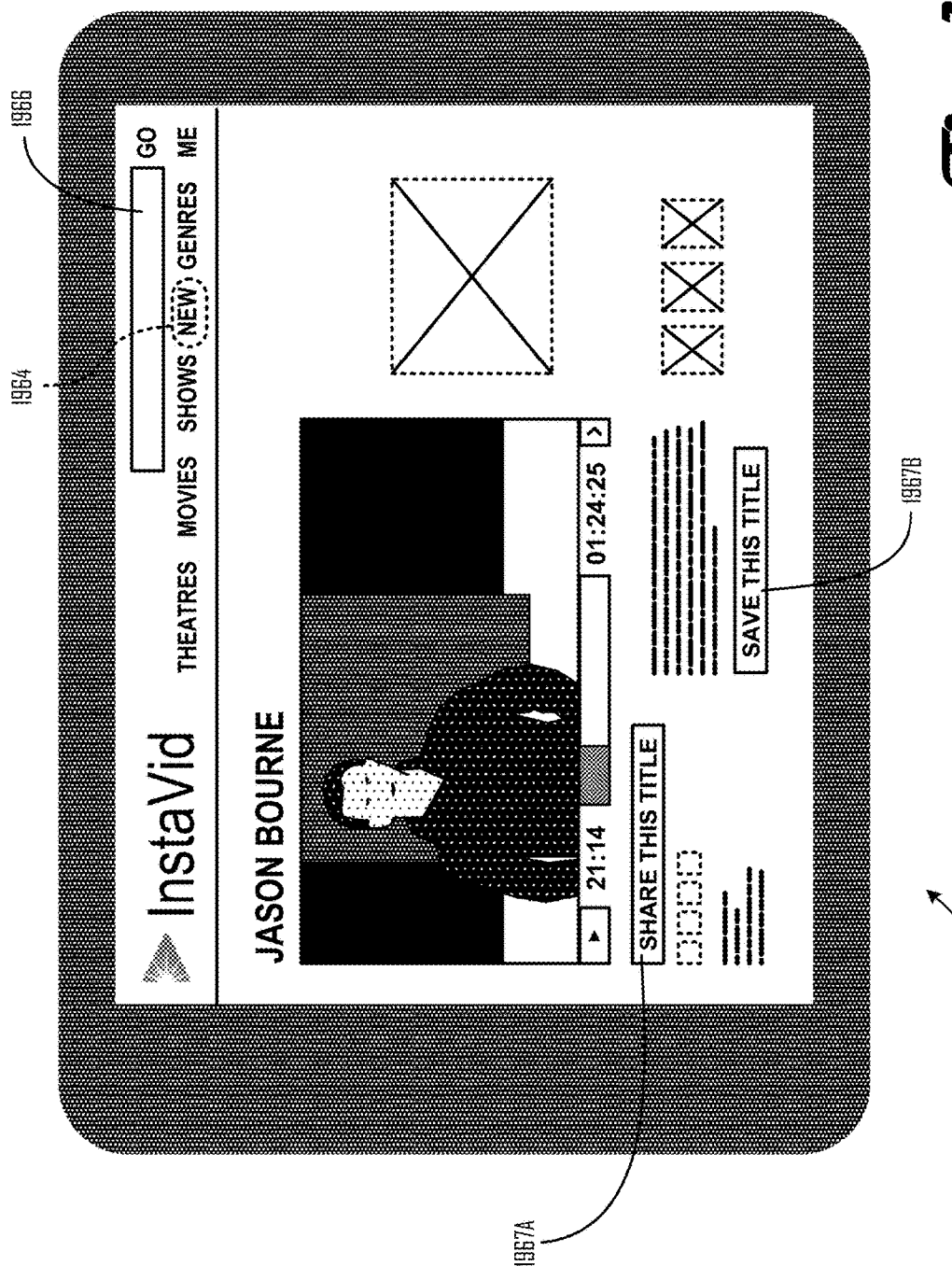
FIG. 19 illustrates another reconfiguration of the system of FIG. 14 in accordance with some embodiments, one in which previewed content has been expanded upon to render the content more fully in response to a user having viewed the preview and then manifested interest in seeing related content.

FIG. 19 depicts a reconfiguration of system 1400 in which previewed content has been expanded upon to render the content more fully in response to a user having viewed the preview and then expressed interest. Following an information request 1190 (a user activation of an "INFO" control concerning the "Jason Bourne" primary content, e.g.), a landing page or other new page 1195 is presented via display hardware 1212. As a result, consumer 1410 now has significantly expanded options in regard to the primary content. Such options may include free (low resolution) access to the entire primary content (controlled via a scroll bar as shown, e.g.); access to new content (using control 1964, e.g.) or other feature offerings; a search facility (including search field 1966, e.g.) for surveying other available preview content; or other controls 1967A-B by which the browsed-and-selected primary content may be enjoyed by consumer 1410.

In light of teachings herein, numerous existing techniques may be applied for configuring special-purpose circuitry or other structures effective for obtaining and applying user preferences, recognition criteria, data associations, or other operational parameters as described herein without undue experimentation. See, e.g., U.S. Pat. No. 9,443,001 ("Method and system to curate media collections"); U.S. Pat. No. 9,367,572 ("Metadata-based file-identification systems and methods"); U.S. Pat. No. 9,342,817 ("Auto-creating groups for sharing photos"); U.S. Pat. No. 9,135,278 ("Method and system to detect and select best photographs"); U.S. Pat. No. 8,718,256 ("Method and system for providing ring back tone played at a point selected by user"); U.S. Pat. No. 8,666,375 ("Customizable media auto-reply systems and methods"); U.S. Pat. No. 8,156,139 ("Media playing on a portable media player including shop and play remote media"); U.S. Pat. No. 7,987,280 ("System and method for locating and capturing desired media content from media broadcasts"); U.S. Pat. No. 7,882,034 ("Digital rights management for content rendering on playback devices"); U.S. Pat. No. 7,617,296 ("Data compilation system and method"); U.S. Pat. No. 7,461,055 ("Method and apparatus for recommending selections based on preferences in a multi-user system"); U.S. Pat. No. 7,430,506 ("Preprocessing of digital audio data for improving perceptual sound quality on a mobile phone"); U.S. Pub. No. 2015/0067077 ("Private messaging and private social network method for creating personal and private online communities through connecting user(s) utilizing physical objects and/or products and associated unique code(s) linked to users, messages, activities, and/or information"); and U.S. Pub. No. 2014/0053061 ("System for clipping web pages"). These documents are incorporated herein by reference to the extent not inconsistent herewith.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A computer-implemented video presentation system comprising:
   transistor-based circuitry (module 1721, e.g.) configured to obtain a graphical container 1408 identified by an embed code 1130 in a web page 1145 at least partly presented by a mobile client device 1200;
   transistor-based circuitry (module 1722, e.g.) configured to present a first preview control 1425 identifying first video content (a movie or videogame, e.g.) and a second preview control 1425 identifying second video content both simultaneously within the graphical container identified by the embed code of the web page and rendered at the mobile client device 1200;
   transistor-based circuitry (module 1723, e.g.) configured to present the second preview control 1425 and preview video content determined by the embed code 1130 and portraying the first video content that supplants at least some of the first preview control 1425 both simultaneously as a conditional response to a user activation of the first preview control 1425 at the mobile client device 1200; and
   transistor-based circuitry (module 1724, e.g.) configured to present the first preview control 1425 and preview video content determined by the embed code 1130 and portraying the second video content that supplants at least some of the second preview control 1425 both simultaneously as a conditional response to a user activation of the second preview control 1425 at the mobile client device 1200.

2. The computer-implemented video presentation system of any of the above SYSTEM CLAUSES, all of the transistor-based circuitry residing on a single application-specific integrated circuit (ASIC).

3. The computer-implemented video presentation system of any of the above SYSTEM CLAUSES, the circuitry thereof being distributed across several server devices.

4. The computer-implemented video presentation system of any of the above SYSTEM CLAUSES, wherein the system is configured to perform any of the METHOD CLAUSES set forth herein.

5. A computer-implemented video presentation method comprising:
   invoking transistor-based circuitry (module 1721, e.g.) configured to obtain a graphical container 1408 identified by an embed code 1130 in a web page 1145 at least partly presented by a mobile client device 1200;
   invoking transistor-based circuitry (module 1722, e.g.) configured to present a first preview control 1425 identifying first video content (a movie or videogame, e.g.) and a second preview control 1425 identifying second video content both simultaneously within the graphical container 1408 identified by the embed code of the web page 1145 and rendered at the mobile client device 1200;
   invoking transistor-based circuitry (module 1723, e.g.) configured to present the second preview control 1425 and preview video content determined by the embed code 1130 and portraying the first video content that supplants at least some of the first preview control 1425 both simultaneously as a conditional response to a user activation of the first preview control 1425 at the mobile client device 1200; and
   invoking transistor-based circuitry (module 1724, e.g.) configured to present the first preview control 1425 and preview video content determined by the embed code 1130 and portraying the second video content that supplants at least some of the second preview control 1425 both simultaneously as a conditional response to a user activation of the second preview control 1425 at the mobile client device 1200.

6. The computer-implemented video presentation method of METHOD CLAUSE 5, comprising:
   invoking transistor-based circuitry 1700 (as a module of circuitry 1618, 1718, e.g.) configured to present several preview controls 1425 simultaneously in a row 1602 that includes the first and second preview controls 1425 via a display screen of the mobile client device 1200.

7. The computer-implemented video presentation method of METHOD CLAUSE 5, comprising:
   invoking transistor-based circuitry configured to present several preview controls 1425 simultaneously in a column 1604 that includes the first and second preview controls 1425 via a display screen of the mobile client device 1200.

8. The computer-implemented video presentation method of METHOD CLAUSE 5, comprising:
   invoking transistor-based circuitry 1700 (as a module of circuitry 1618, 1718, e.g.) configured to present several preview controls 1425 simultaneously in a 2×2 or larger grid via a display screen of the mobile client device 1200 wherein the first and second preview controls 1425 are in different respective rows 1602 and columns 1604 (not vertically or horizontally aligned, e.g.).

9. The computer-implemented video presentation method of any of the above METHOD CLAUSES, wherein the second video content is a component of a game.

10. The computer-implemented video presentation method of any of the above METHOD CLAUSES, wherein the first video content is a movie.

11. The computer-implemented video presentation method of any of the above METHOD CLAUSES, wherein the first and second video content are both works of fiction.

12. The computer-implemented video presentation method of any of the above METHOD CLAUSES, comprising:
    invoking transistor-based circuitry 1700 (as a module of circuitry 1618, 1718, e.g.) configured to present several items of preview video content sequentially as an automatic and conditional response to a loading of the graphical container 1408 identified by the embed code at the mobile client device 1200, wherein a first one of the several items is the preview video content portraying the first video content and wherein a second one of the several items is the preview video content portraying the second video content.

13. The computer-implemented video presentation method of any of the above METHOD CLAUSES, comprising:
    invoking transistor-based circuitry 1700 (as a module of circuitry 1618, 1718, e.g.) configured to present several items of preview video content sequentially as an automatic and conditional response to a loading of the graphical container 1408 identified by the embed code at the mobile client device 1200 and before the user activations of the first and second preview controls 1425 at the mobile client device 1200, wherein a first one of the several items is the preview video content portraying the first video content and wherein a second one of the several items is the preview video content portraying the second video content.

14. The computer-implemented video presentation method of any of the above METHOD CLAUSES, comprising:
    invoking the transistor-based circuitry configured to present the first preview control 1425 and the preview video content determined by the embed code and portraying the second video content both simultaneously as an immediate conditional response to the user touching a photographic image on a touchscreen display as the user activation of the second preview control 1425 at the mobile client device 1200, the second preview control 1425 being the photographic image, the photographic image being part of the second video content.

15. The computer-implemented video presentation method of any of the above METHOD CLAUSES, comprising:
invoking transistor-based circuitry 1700 (as a module of circuitry 1618, 1718, e.g.) configured to stream the preview video content portraying the second video content as the conditional response to the user activation of the second preview control 1425 at the mobile client device 1200; and invoking transistor-based circuitry 1700 (as a module of circuitry 1618, 1718, e.g.) configured to stream the second video content as the conditional response to another user action at the mobile client device 1200.

16. The computer-implemented video presentation method of any of the above METHOD CLAUSES, comprising:
invoking transistor-based circuitry 1700 (as a module of circuitry 1618, 1718, e.g.) configured to replace preview video content portraying third video content with the preview video content portraying first video content before presenting the preview video content portraying the first video content and without modifying the preview video content portraying the second video content.

17. The computer-implemented video presentation method of any of the above METHOD CLAUSES, comprising:
invoking transistor-based circuitry 1700 (as a module of circuitry 1618, 1718, e.g.) configured to replace preview video content portraying third video content with the preview video content portraying first video content before presenting the preview video content portraying the first video content and without modifying the embed code.

18. The computer-implemented video presentation method of any of the above METHOD CLAUSES, comprising:
invoking transistor-based circuitry 1700 (as a module of circuitry 1618, 1718, e.g.) configured to generate the preview video content by distilling from an initial duration T1 of the first video content and from an initial duration T2 of the second video content into a uniform, smaller duration T3 of the preview video content portraying each of the first and second video content, wherein T1 is not equal to T2.

19. The computer-implemented video presentation method of any of the above METHOD CLAUSES, wherein the preview video content has been generated by distilling from an initial C1 frames of the first video content (having frame count 1483E, e.g.) and from an initial C2 frames of the second video content (having another frame count 1483, e.g.) a uniform, smaller number C3 of frames of the preview video content (having frame count 1483F, e.g.) portraying each of the first and second video content, wherein C1 is not equal to C2 and wherein C3>150 frames.

20. The computer-implemented video presentation method of any of the above METHOD CLAUSES, comprising:
invoking transistor-based circuitry 1700 (as a module of circuitry 1618, 1718, e.g.) configured to generate the preview video content by distilling from an initial C1 frames of the first video content and from an initial C2 frames of the second video content into a uniform, smaller number C3 of frames of the preview video content portraying each of the first and second video content, wherein C1 is not equal to C2 and wherein C3<750 frames.

21. The computer-implemented video presentation method of any of the above METHOD CLAUSES, comprising:
invoking transistor-based circuitry 1700 (as a module of circuitry 1618, 1718, e.g.) configured to generate the preview video content by distilling from an initial (storage) frame resolution R1 of the first video content (having height 1484E and width 1485E, e.g.) and from an initial (storage) frame resolution R2 of the second video content (having another height 1484 and width 1485, e.g.) into a uniform, smaller (storage) frame resolution R3 of the preview video content (having height 1484F and width 1485F as R3, e.g.) portraying each of the first and second video content, wherein R1 is not equal to R2.

22. The computer-implemented video presentation method of any of the above METHOD CLAUSES, comprising:
invoking transistor-based circuitry 1700 (as a module of circuitry 1618, 1718, e.g.) configured to generate the preview video content by distilling from an initial frame width W1 of the first video content (having width 1485E, e.g.) and from an initial frame width W2 of the second video content (having another width 1485, e.g.) into a uniform, smaller width W3 of the preview video content (having width 1485F as W3, e.g.) portraying each of the first and second video content, wherein W1 is not equal to W2 and wherein W3<640 pixels.

23. The computer-implemented video presentation method of any of the above METHOD CLAUSES, wherein the preview video content has been generated by distilling from an initial frame width W1 of the first video content and from an initial frame width W2 of the second video content a uniform, smaller width W3 of the preview video content portraying each of the first and second video content, wherein W1 is not equal to W2 and wherein W3>120 pixels.

24. The computer-implemented video presentation method of any of the above METHOD CLAUSES, comprising:
invoking transistor-based circuitry 1700 (as a module of circuitry 1618, 1718, e.g.) configured to generate the preview video content by distilling from an initial frame height H1 of the first video content (having height 1484E, e.g.) and from an initial frame height H2 of the second video content (having another height 1484, e.g.) into a uniform, smaller height H3 of the preview video content (having height 1484F as H3, e.g.) portraying each of the first and second video content, wherein H1 is not equal to H2 and wherein H3<480 pixels.

25. The computer-implemented video presentation method of any of the above METHOD CLAUSES, wherein the preview video content has been generated by distilling from an initial frame height H1 of the first video content and from an initial frame height H2 of the second video content into a uniform, smaller height H3 of the preview video content portraying each of the first and second video content, wherein H1 is not equal to H2 and wherein H3>67 pixels.

26. The computer-implemented video presentation method of any of the above METHOD CLAUSES, comprising:
invoking transistor-based circuitry 1700 (as a module of circuitry 1618, 1718, e.g.) configured to present either first or second streaming media content as the second video content based upon an Internet protocol address associated with the mobile client device 1200 after presenting the preview video content determined by the embed code and portraying the second video content as the conditional response to the user activation of the second preview control 1425 at the mobile client device 1200.

27. The computer-implemented video presentation method of any of the above METHOD CLAUSES, comprising:

invoking transistor-based circuitry 1700 (as a module of circuitry 1618, 1718, e.g.) configured to present a plurality of user-selectable icons on a Web search results page at the mobile client device 1200 as the first preview control 1425 identifying first video content and the second preview control 1425 identifying second video content both simultaneously visible within the graphical container 1408 identified by the embed code of the web page 1145 rendered at the mobile client device 1200.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A computer-implemented video presentation method comprising:

invoking transistor-based circuitry configured to obtain a graphical container identified by an embed code in a web page at least partly presented by a mobile client device;

invoking transistor-based circuitry configured to present a first preview control identifying first video content and a second preview control identifying second video content both simultaneously within the graphical container identified by the embed code of the web page and rendered at the mobile client device;

invoking transistor-based circuitry configured to present several items of preview video content sequentially as an automatic and conditional response to a loading of the graphical container identified by the embed code at the mobile client device;

invoking transistor-based circuitry configured to present the second preview control and preview video content determined by the embed code and portraying the first video content that supplants at least some of the first preview control both simultaneously as a conditional response to a user activation of the first preview control at the mobile client device; and invoking transistor-based circuitry configured to present the first preview control and preview video content determined by the embed code and portraying the second video content that supplants at least some of the second preview control both simultaneously as a conditional response to a user activation of the second preview control at the mobile client device;

wherein a first one of the several items is the preview video content portraying the first video content and wherein a second one of the several items is the preview video content portraying the second video content;

wherein the preview video content has been generated by distilling a uniform, smaller number of frames C3 from each of an initial number of frames C1 of the first video content and from an initial number of frames C2 of the second video content, the uniform, smaller number of frames C3 portraying a portion of each of the first and second video content; wherein C1 is not equal to C2 and wherein C3>150 frames;

wherein the preview video content has been generated by distilling a uniform, smaller width W3 from each of an initial frame width W1 of the first video content and from an initial frame width W2 of the second video content, the uniform, smaller frame width W3 portraying a portion of each of the first and second video content; wherein W1 is not equal to W2 and wherein W3>120 pixels; and wherein the preview video content has been generated by distilling a uniform, smaller height H3 from each of an initial frame height H1 of the first video content and from an initial frame height H2 of the second video content, the uniform, smaller height H3 portraying a portion of each of the first and second video content; wherein H1 is not equal to H2 and wherein H3>67 pixels.

2. The computer-implemented video presentation method of claim 1 comprising:

invoking transistor-based circuitry configured to generate the preview video content by distilling a uniform, smaller number of frames C3 from each of the initial C1 frames of the first video content and from the initial C2 frames of the second video content, the uniform, smaller number C3 of frames of the preview video content portraying a portion of each of the first and second video content, wherein C1 is not equal to C2 and wherein C3<750 frames.

3. The computer-implemented video presentation method of claim 1 comprising:

invoking transistor-based circuitry configured to generate the preview video content by distilling a uniform, smaller height H3 from each of the initial frame height H1 of the first video content and from the initial frame height H2 of the second video content, the uniform, smaller height H3 of the preview video content portraying a portion of each of the first and second video content, wherein H1 is not equal to H2 and wherein H3<480 pixels.

4. The computer-implemented video presentation method of claim 1 comprising:

invoking transistor-based circuitry configured to generate the preview video content by distilling a uniform, smaller width W3 from each of the initial frame width W1 of the first video content and from the initial frame width W2 of the second video content, the uniform, smaller width W3 of the preview video content portraying a portion of each of the first and second video content, wherein W1 is not equal to W2 and wherein W3<640 pixels.

5. The computer-implemented video presentation method of claim 1 comprising:

invoking transistor-based circuitry configured to present several preview controls simultaneously in a 2×2 or larger grid via a display screen of the mobile client device wherein the first and second preview controls are in different respective rows and columns, wherein the first and second video content are both works of fiction.

6. A computer-implemented video presentation method comprising:

invoking transistor-based circuitry configured to obtain a graphical container identified by an embed code in a web page at least partly presented by a mobile client device;

invoking transistor-based circuitry configured to present a first preview control identifying first video content and a second preview control identifying second video content both simultaneously within the graphical container identified by the embed code of the web page and rendered at the mobile client device;

invoking transistor-based circuitry configured to present the second preview control and preview video content determined by the embed code and portraying the first video content that supplants at least some of the first preview control both simultaneously as a conditional response to a user activation of the first preview control at the mobile client device; and invoking transistor-based circuitry configured to present the first preview control and preview video content determined by the embed code and portraying the second video content that supplants at least some of the second preview control both simultaneously as a conditional response to a user activation of the second preview control at the mobile client device;

wherein the preview video content has been generated by distilling a uniform, smaller number of frames from each of the first video content and second video content, wherein the uniform, smaller number of frames is more than 150 frames, the preview video content portraying a portion of each of the first and second video content;

wherein the preview video content has been generated by distilling a uniform, smaller frame width from each of a frame width of the first video content and a frame width of the second video content, wherein the uniform, smaller frame width is more than 120 pixels wide, the preview video content portraying a portion of each of the first and second video content; and wherein the preview video content has been generated by distilling a uniform smaller frame height from a frame height of the first video content and a frame height of the second video content, wherein the uniform, smaller frame height is more than 67 pixels high, the preview video content portraying a portion of each of the first and second video content.

7. The computer-implemented video presentation method of claim 6, comprising:

invoking transistor-based circuitry configured to present several items of preview video content sequentially as an automatic and conditional response to a loading of the graphical container identified by the embed code at the mobile client device, wherein a first one of the several items is the preview video content portraying the first video content and wherein a second one of the several items is the preview video content portraying the second video content, wherein the first and second video content are both works of fiction.

8. The computer-implemented video presentation method of claim 6, comprising:

invoking transistor-based circuitry configured to present several items of preview video content sequentially as an automatic and conditional response to a loading of the graphical container identified by the embed code at the mobile client device and before the user activations of the first and second preview controls at the mobile client device, wherein a first one of the several items is the preview video content portraying the first video content and wherein a second one of the several items is the preview video content portraying the second video content.

9. The computer-implemented video presentation method of claim 6, comprising:

invoking the transistor-based circuitry configured to present the first preview control and the preview video content determined by the embed code and portraying the second video content both simultaneously as an immediate conditional response to the user touching a photographic image on a touchscreen display as the user activation of the second preview control at the mobile client device, the second preview control being the photographic image, the photographic image being part of the second video content.

10. The computer-implemented video presentation method of claim 6, comprising:

invoking transistor-based circuitry configured to stream the preview video content portraying the second video content as the conditional response to the user activation of the second preview control at the mobile client device; and invoking transistor-based circuitry configured to stream the second video content as the conditional response to another user action at the mobile client device.

11. The computer-implemented video presentation method of claim 6, comprising:

invoking transistor-based circuitry configured to present several preview controls simultaneously in a column that includes the first and second preview controls via a display screen of the mobile client device.

12. The computer-implemented video presentation method of claim 6, comprising:

invoking transistor-based circuitry configured to present several preview controls simultaneously in a 2×2 or larger grid via a display screen of the mobile client device wherein the first and second preview controls are in different respective rows and columns.

13. The computer-implemented video presentation method of claim 6, comprising:

invoking transistor-based circuitry configured to replace preview video content portraying third video content with the preview video content portraying first video content before presenting the preview video content portraying the first video content and without modifying the preview video content portraying the second video content.

14. The computer-implemented video presentation method of claim 6, comprising:

invoking transistor-based circuitry configured to replace preview video content portraying third video content with the preview video content portraying first video content before presenting the preview video content portraying the first video content and without modifying the embed code.

15. The computer-implemented video presentation method of claim 6, wherein the preview video content has been generated by distilling a uniform, smaller number of frames C3 from each of an initial C1 frames of the first video content and from an initial C2 frames of the second video content, the uniform, smaller number of frames C3 portraying a portion of each of the first and second video content, wherein C1 is not equal to C2 and wherein C3>150 frames.

16. The computer-implemented video presentation method of claim 6, comprising:

invoking transistor-based circuitry configured to generate the preview video content by distilling a uniform, smaller number of frames C3 from each of an initial C1 frames of the first video content and from an initial C2 frames of the second video content, the uniform, smaller number of frames C3 portraying a portion of each of the first and second video content, wherein C1 is not equal to C2 and wherein C3<750 frames.

17. The computer-implemented video presentation method of claim 6, comprising:
    invoking transistor-based circuitry configured to generate the preview video content by distilling a uniform, smaller frame resolution R3 from each of an initial frame resolution R1 of the first video content and from an initial frame resolution R2 of the second video content, the uniform, smaller frame resolution R3 portraying a portion of each of the first and second video content, wherein R1 is not equal to R2.

18. The computer-implemented video presentation method of claim 6, comprising:
    invoking transistor-based circuitry configured to present either first or second streaming media content as the second video content based upon an Internet protocol address associated with the mobile client device after presenting the preview video content determined by the embed code and portraying the second video content as the conditional response to the user activation of the second preview control at the mobile client device.

19. A computer-implemented video presentation system comprising:
    transistor-based circuitry configured to obtain a graphical container identified by an embed code in a web page at least partly presented by a mobile client device;
    transistor-based circuitry configured to present a first preview control identifying first video content and a second preview control identifying second video content both simultaneously within the graphical container identified by the embed code of the web page rendered at the mobile client device;
    transistor-based circuitry configured to present the second preview control and preview video content determined by the embed code and portraying the first video content that supplants at least some of the first preview control both simultaneously as a conditional response to a user activation of the first preview control at the mobile client device; and
    transistor-based circuitry configured to present the first preview control and preview video content determined by the embed code and portraying the second video content that supplants at least some of the second preview control both simultaneously as a conditional response to a user activation of the second preview control at the mobile client device;
    wherein the preview video content has been generated by distilling, from each of the first video content and the second video content, a uniform, smaller number of frames, frame width, and frame height, the preview video content portraying a portion of each of the first and second video content.

* * * * *